June 22, 1943. J. W. FAY 2,322,430
MACHINE FOR PACKAGING EDIBLE PRODUCTS
Filed Nov. 16, 1939 24 Sheets-Sheet 5
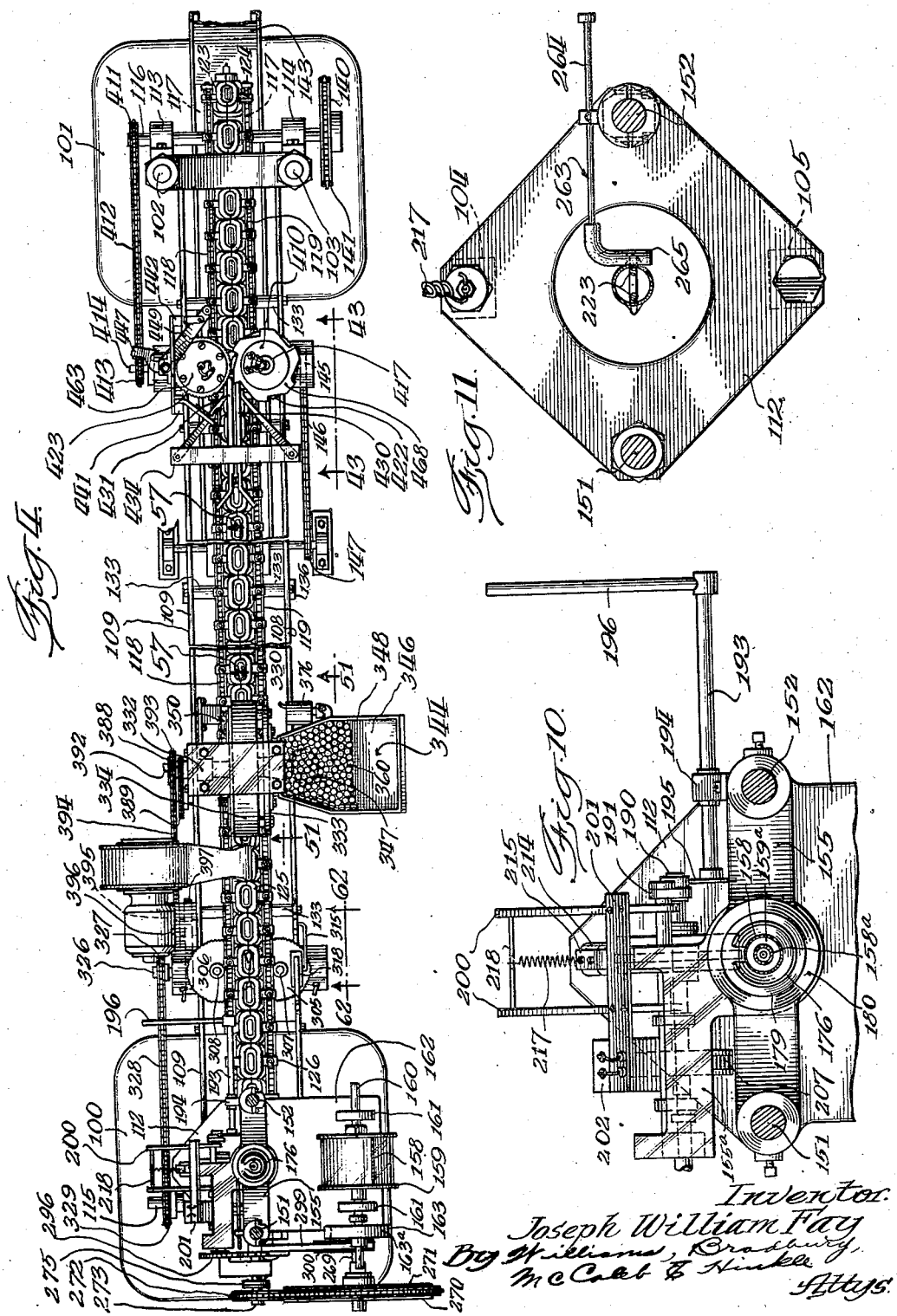
Inventor:
Joseph William Fay
By Williams, Bradbury,
McCaleb & Hinkle
Attys.

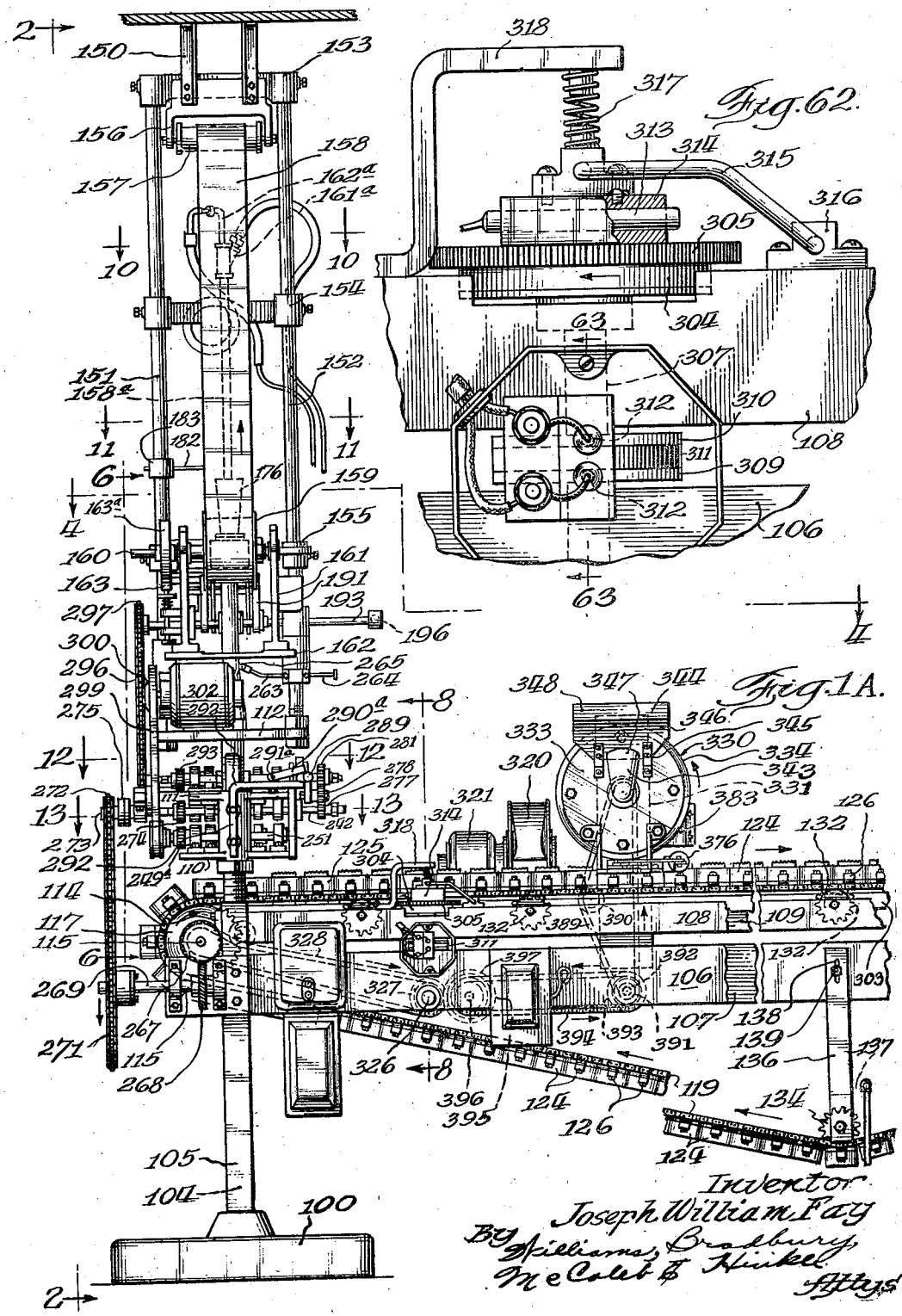

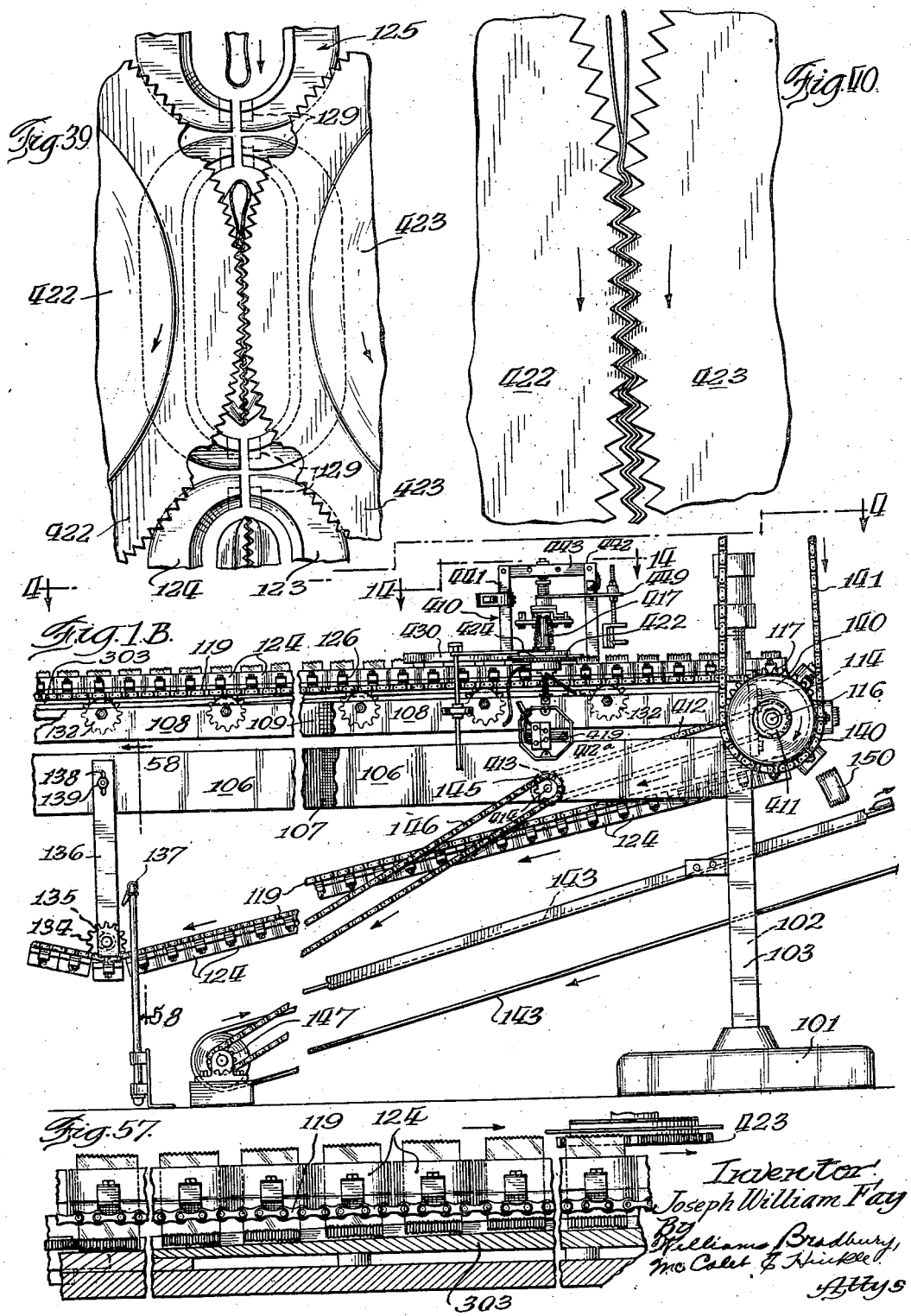

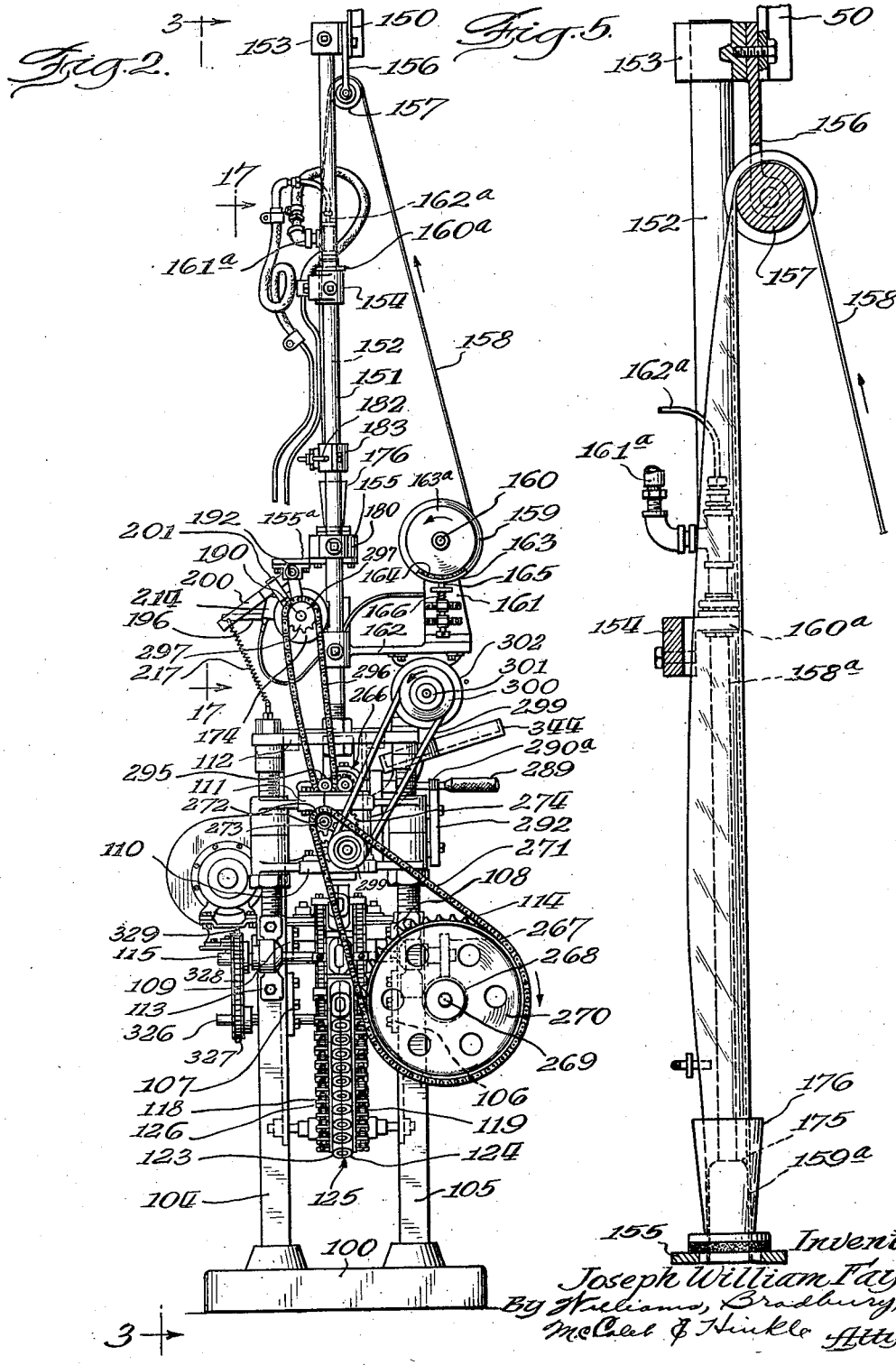

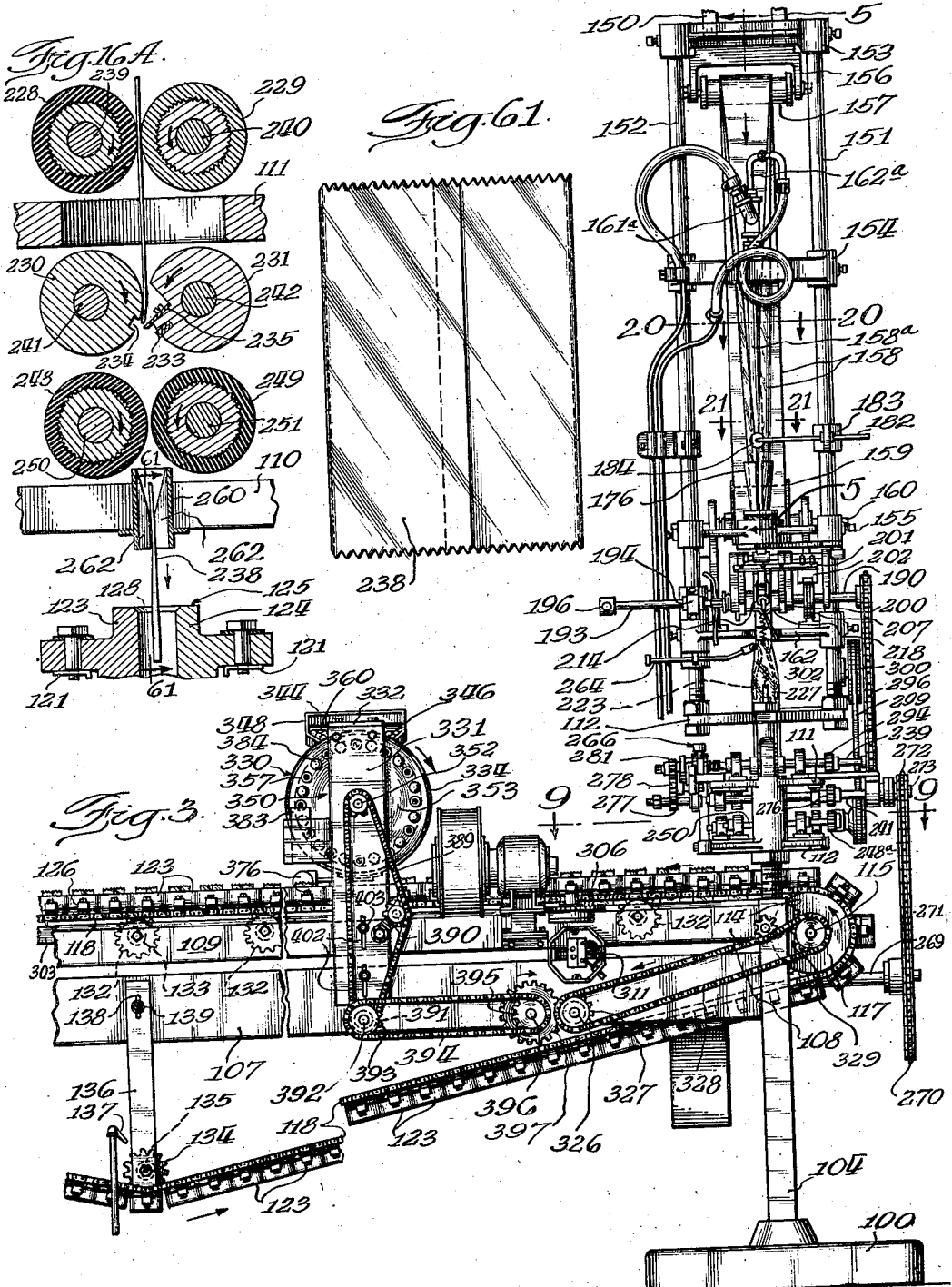

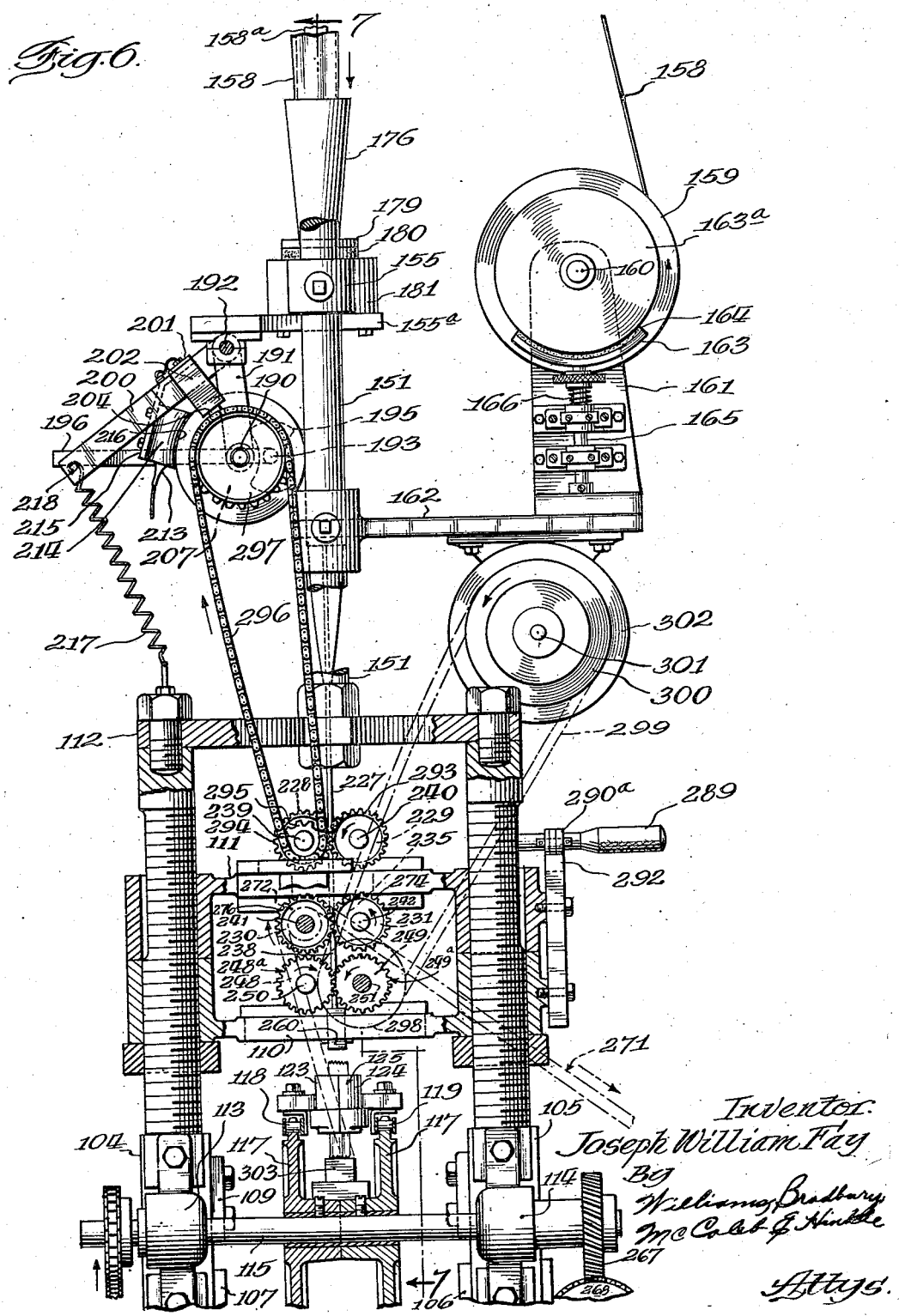

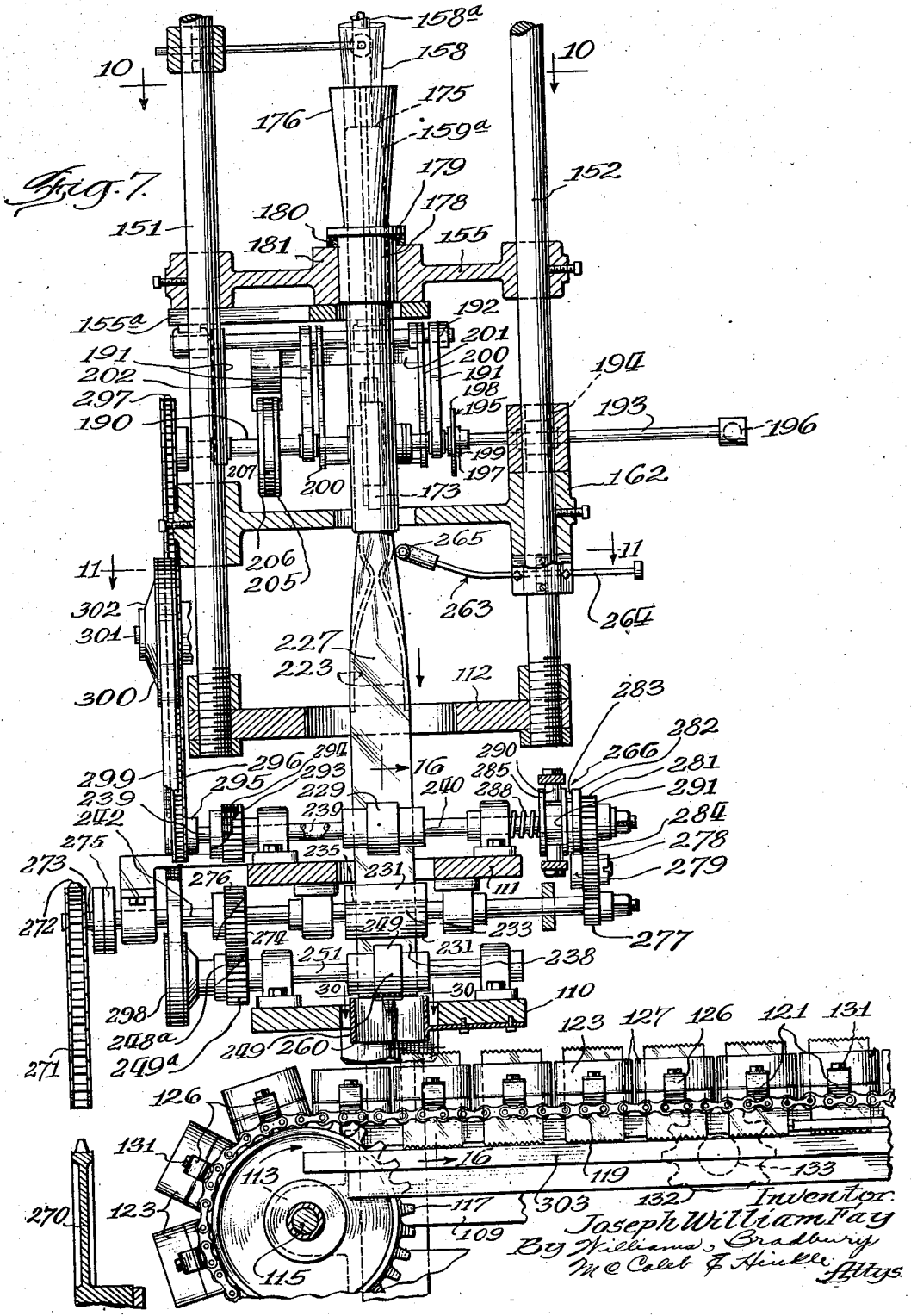

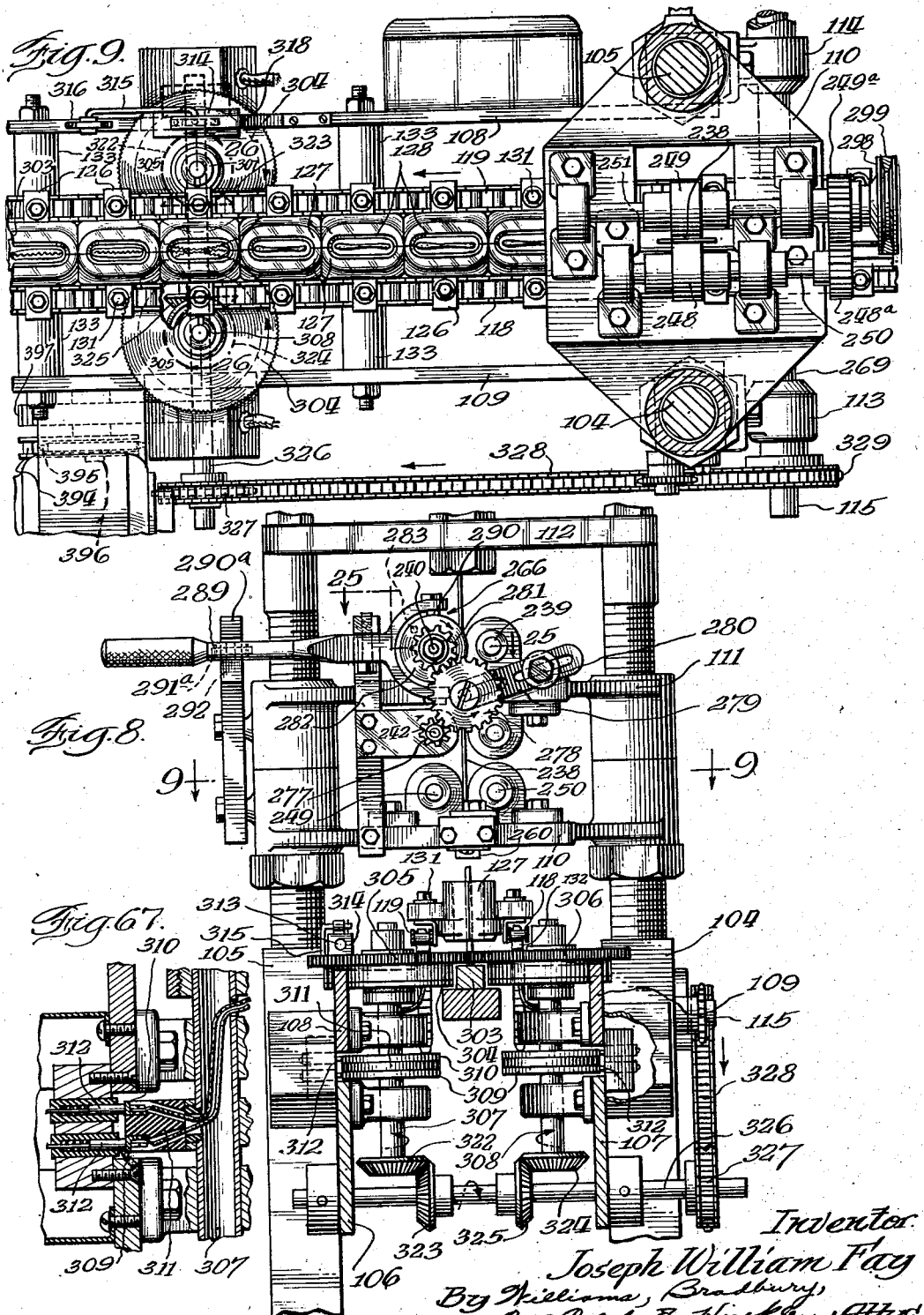

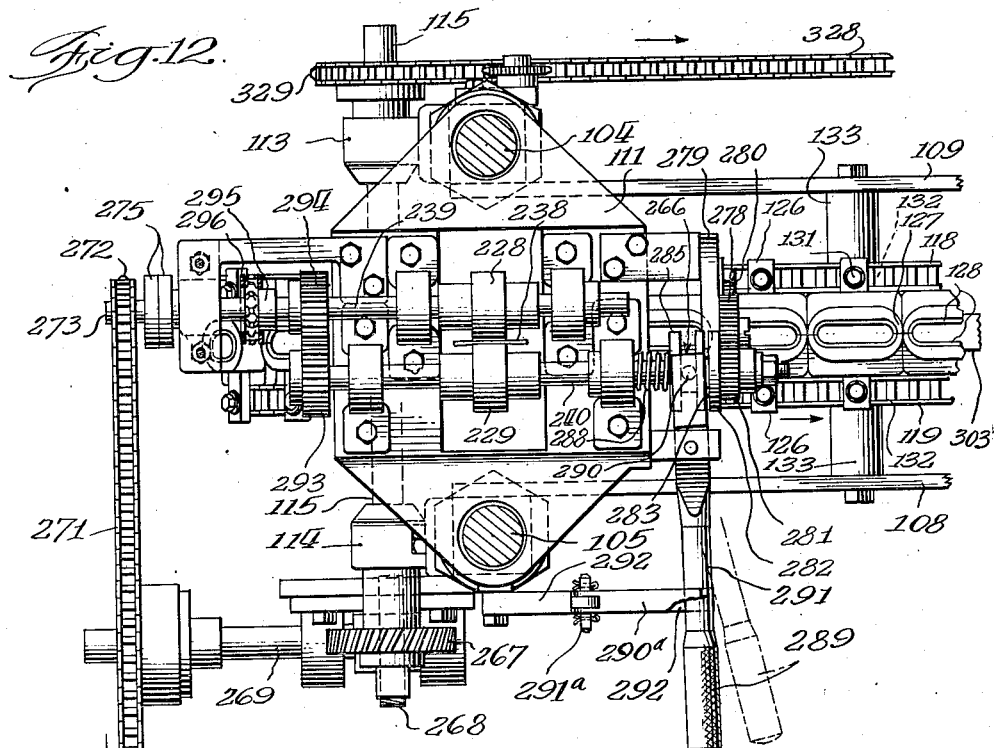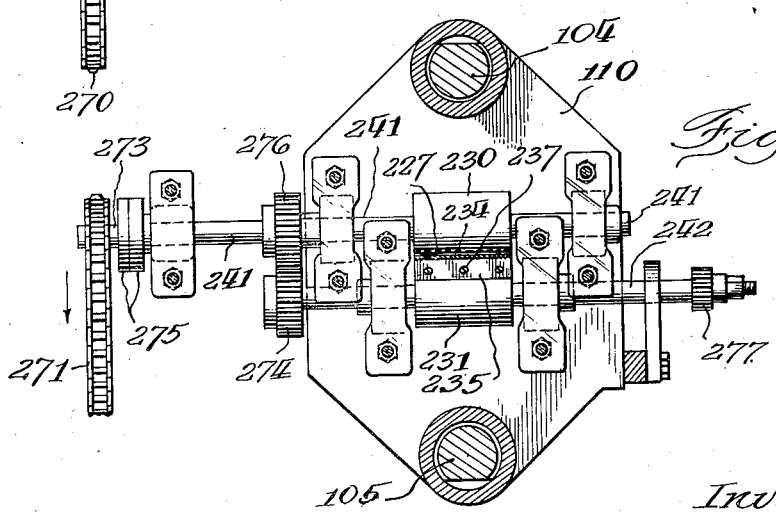

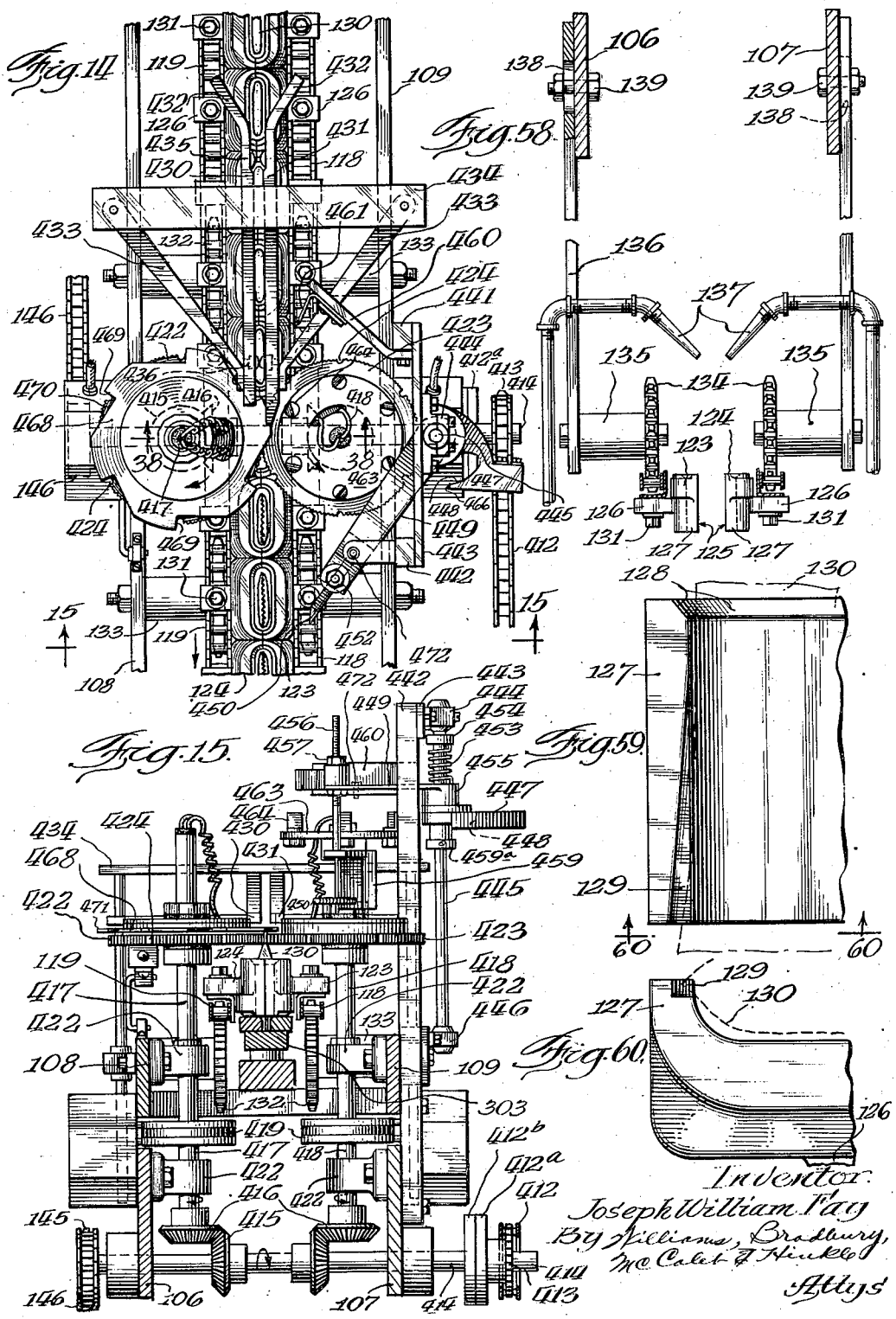

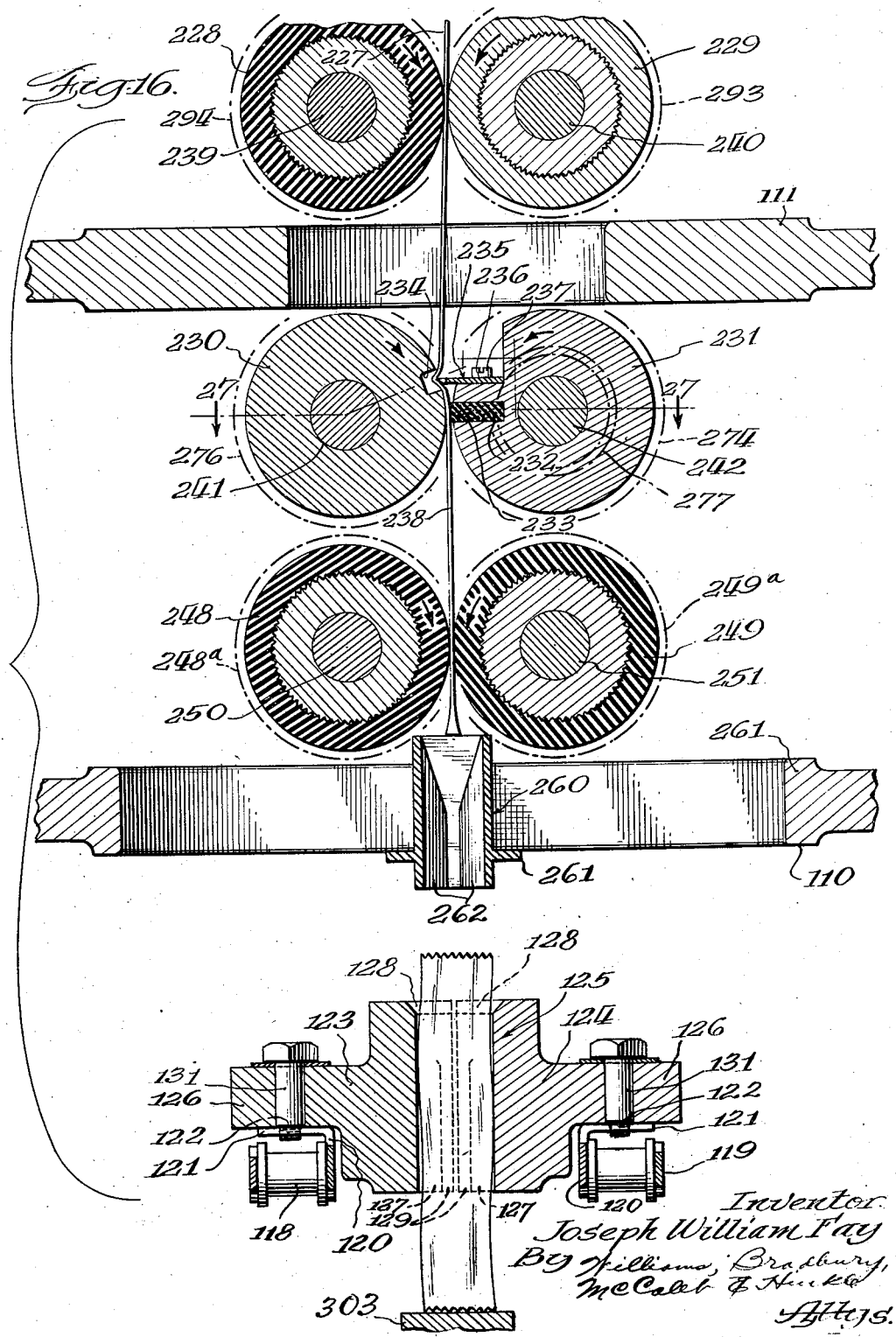

June 22, 1943. J. W. FAY 2,322,430
MACHINE FOR PACKAGING EDIBLE PRODUCTS
Filed Nov. 16, 1939 24 Sheets-Sheet 12
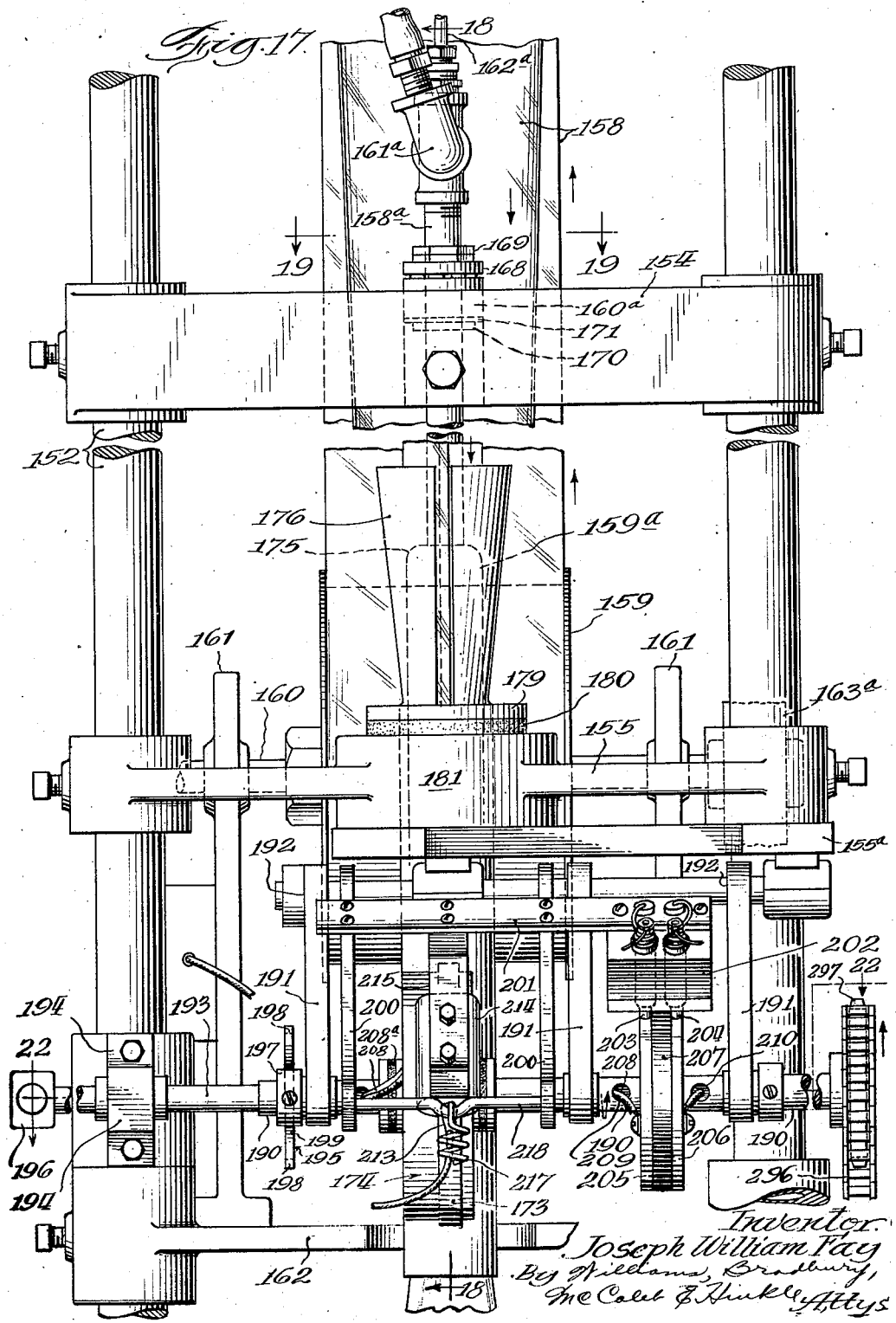

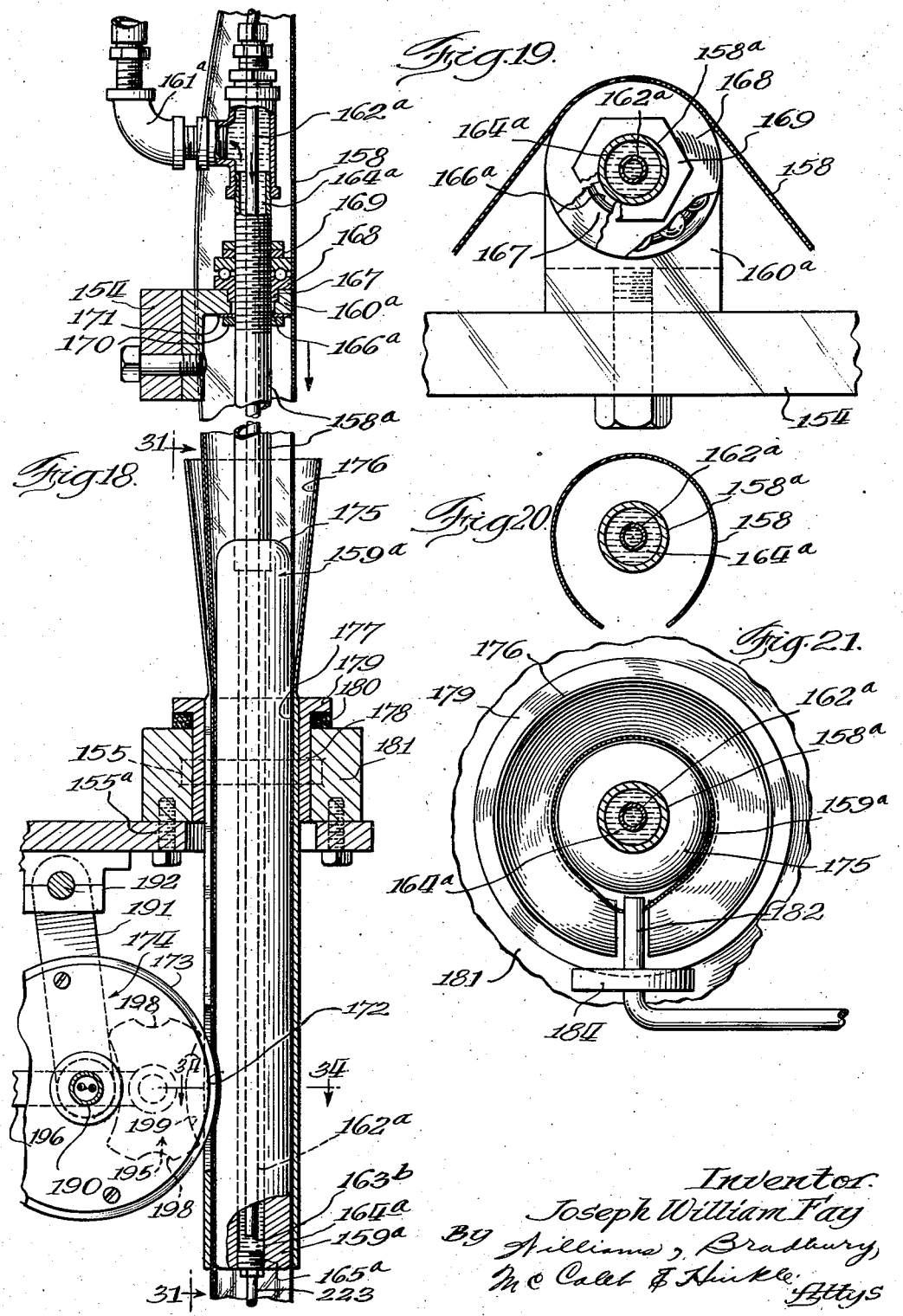

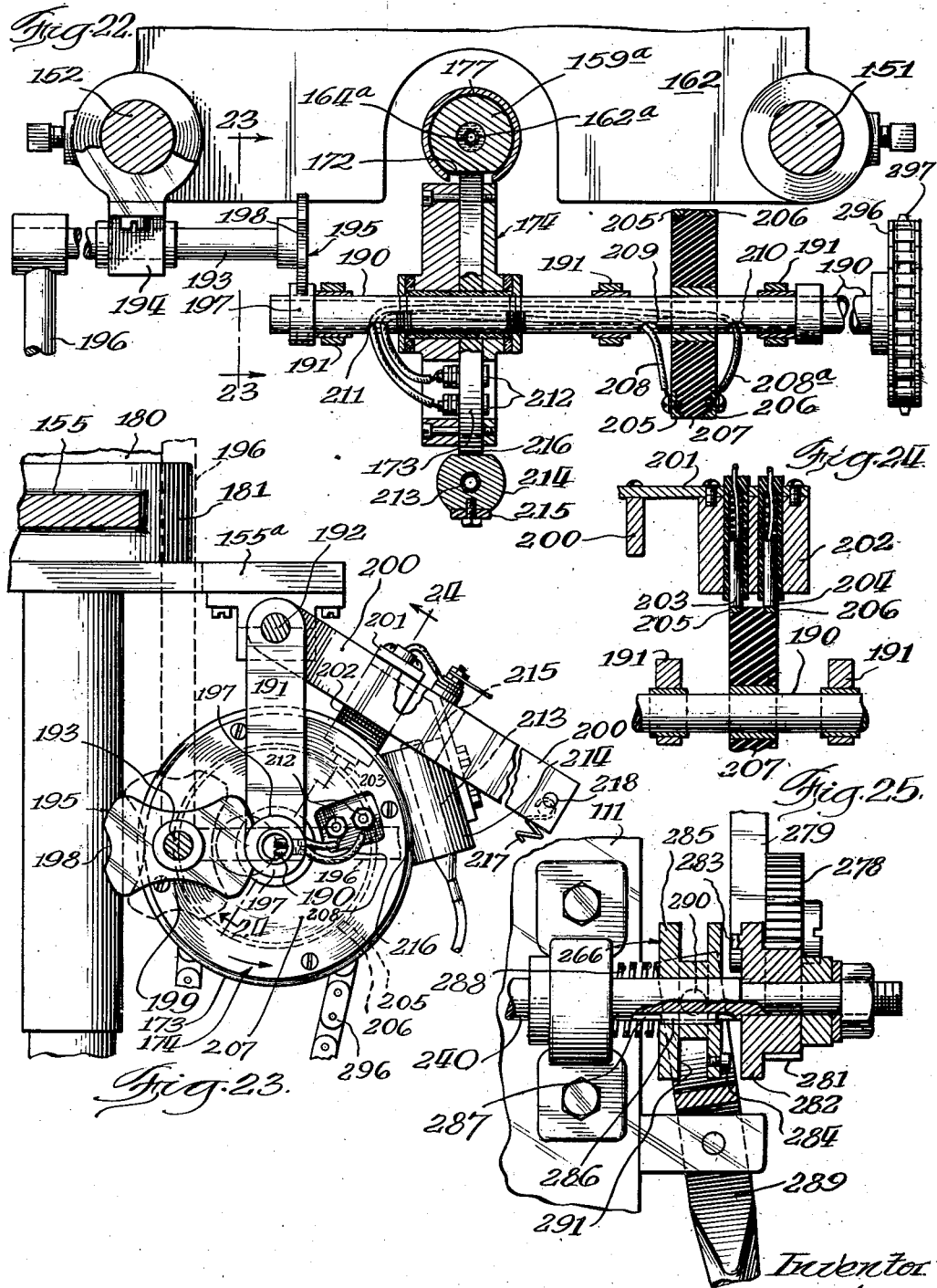

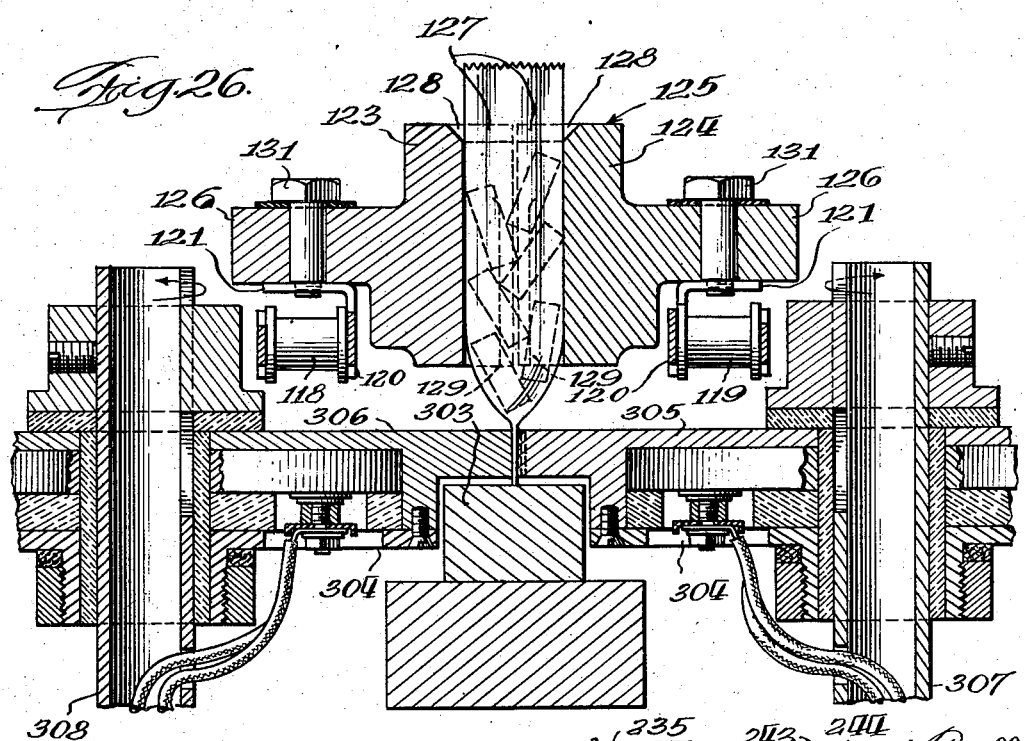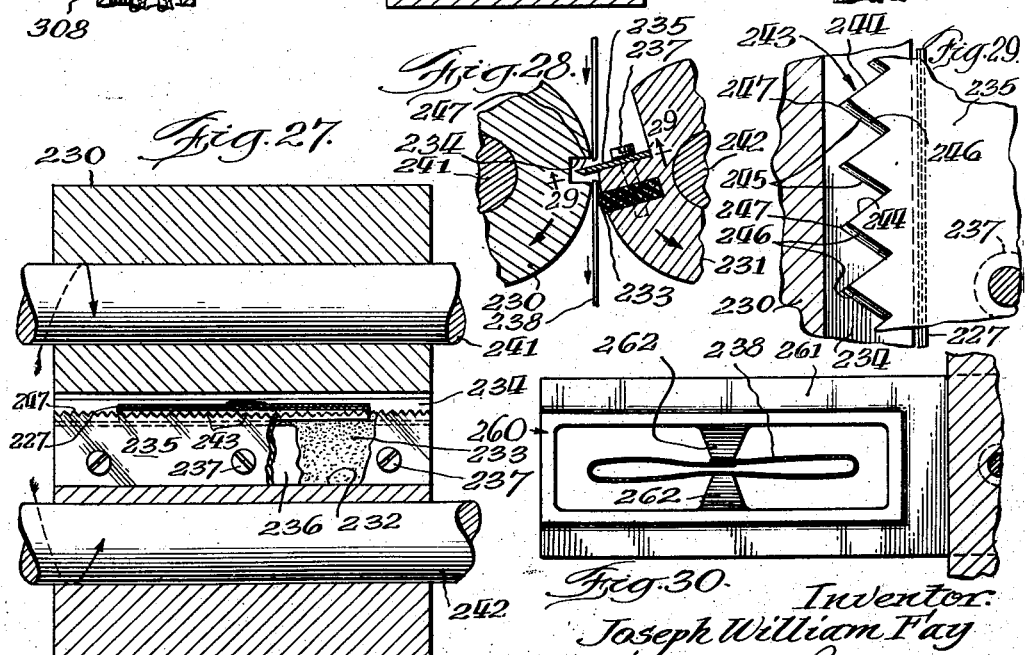

June 22, 1943. J. W. FAY 2,322,430
MACHINE FOR PACKAGING EDIBLE PRODUCTS
Filed Nov. 16, 1939 24 Sheets-Sheet 16
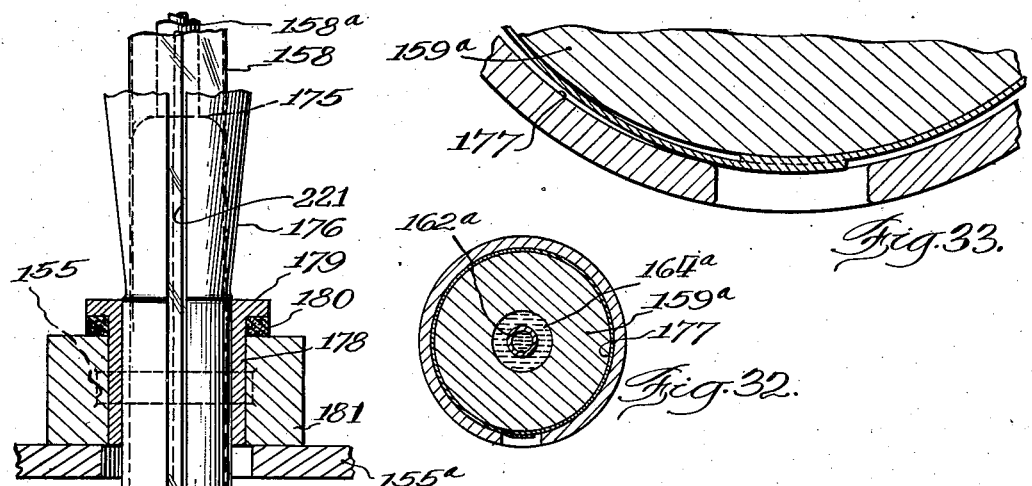
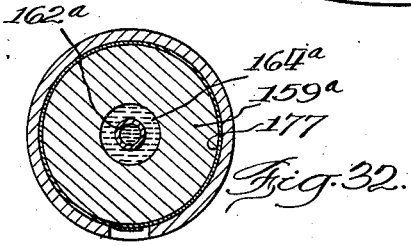
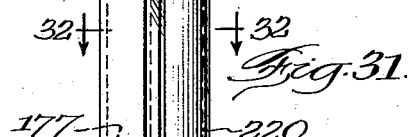
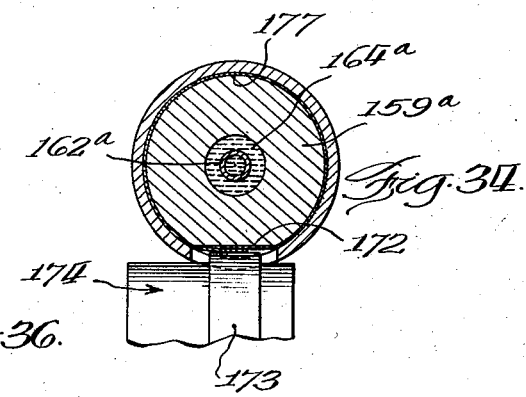
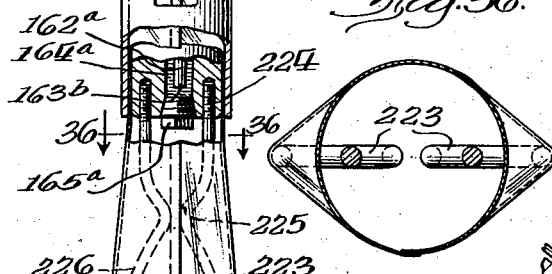
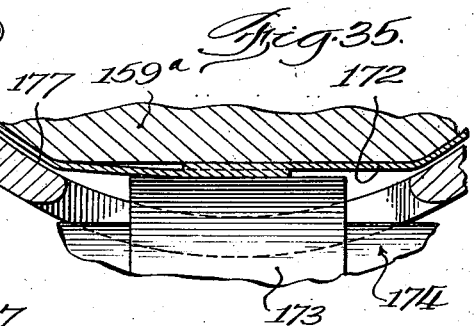
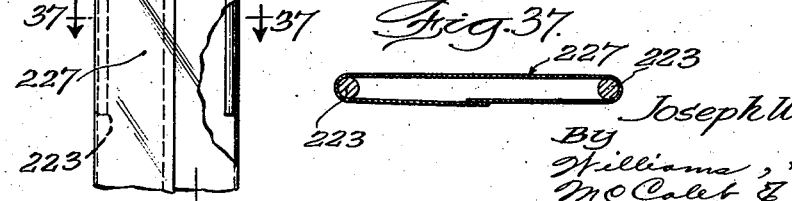
Inventor:
Joseph William Fay
By Williams, Bradbury,
McCaleb & Hinkle
Attys.

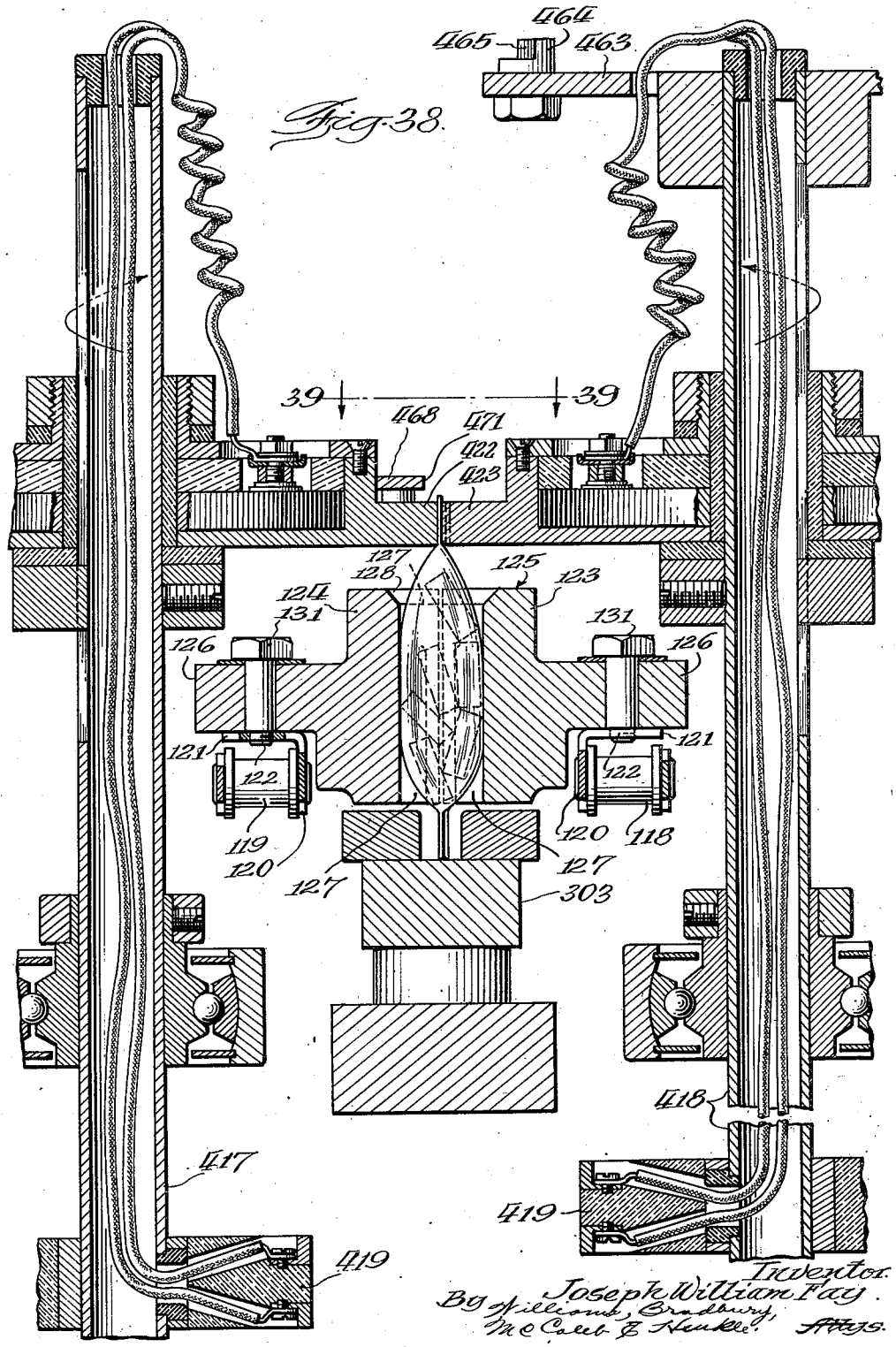

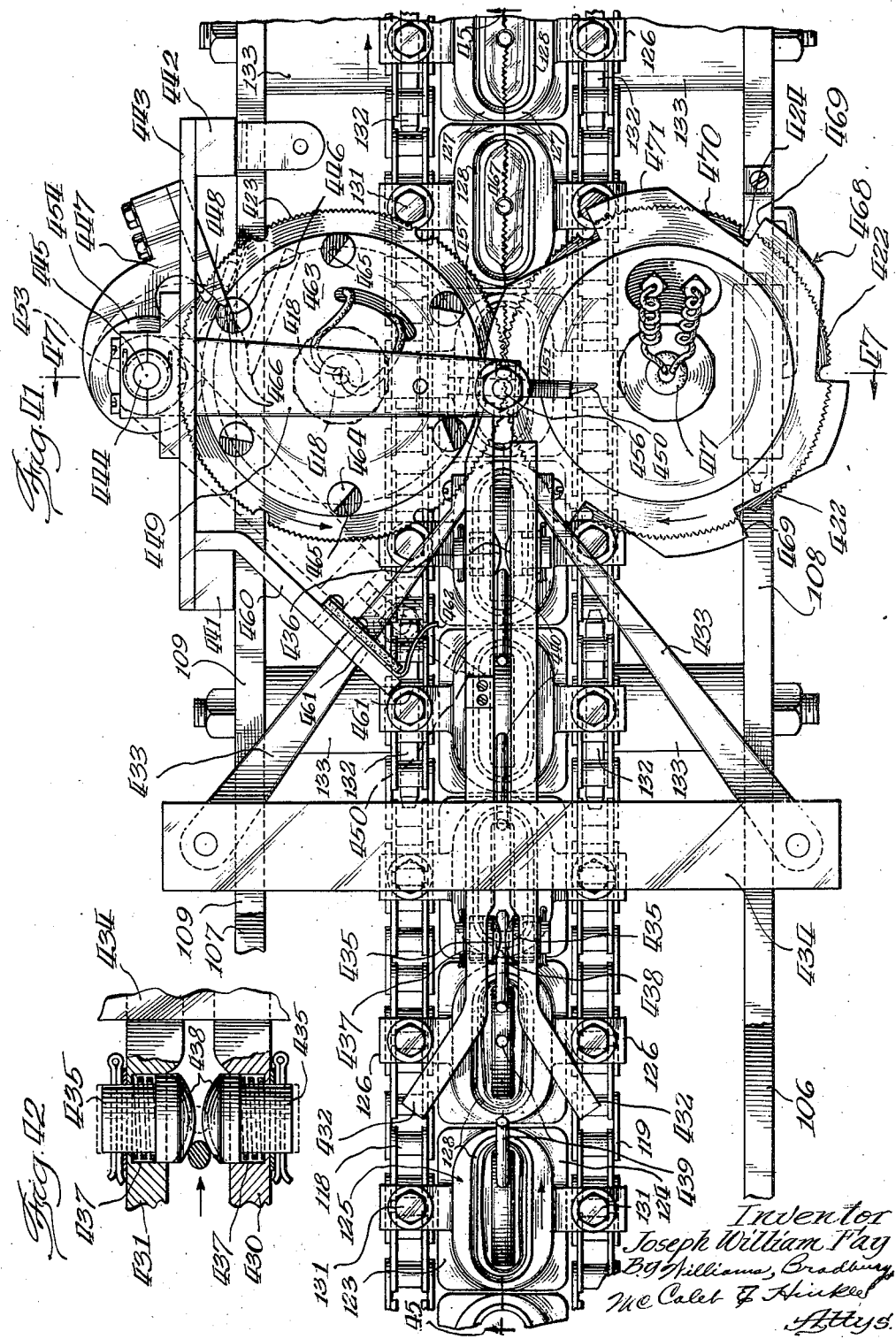

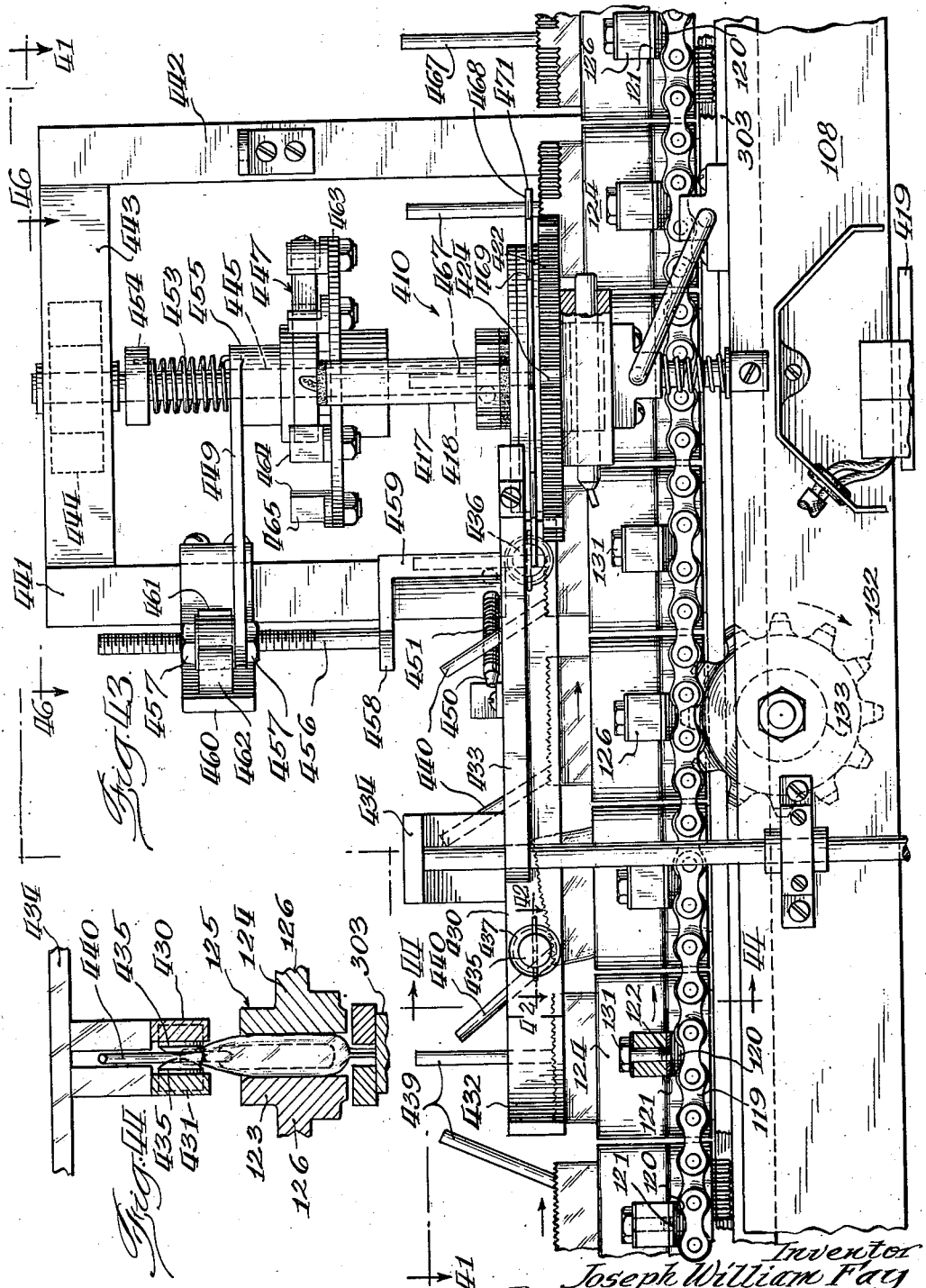

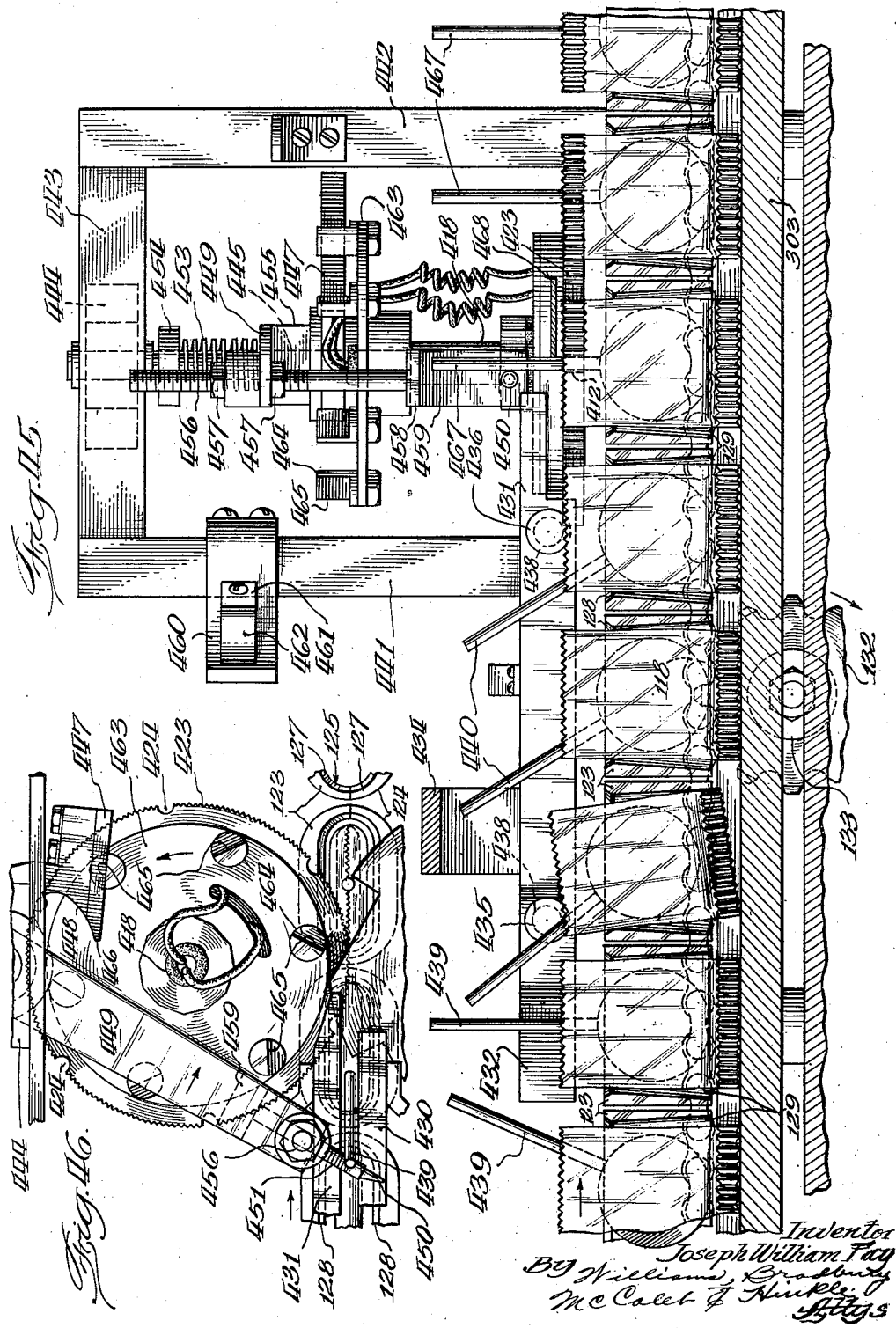

June 22, 1943.   J. W. FAY   2,322,430
MACHINE FOR PACKAGING EDIBLE PRODUCTS
Filed Nov. 16, 1939   24 Sheets-Sheet 21
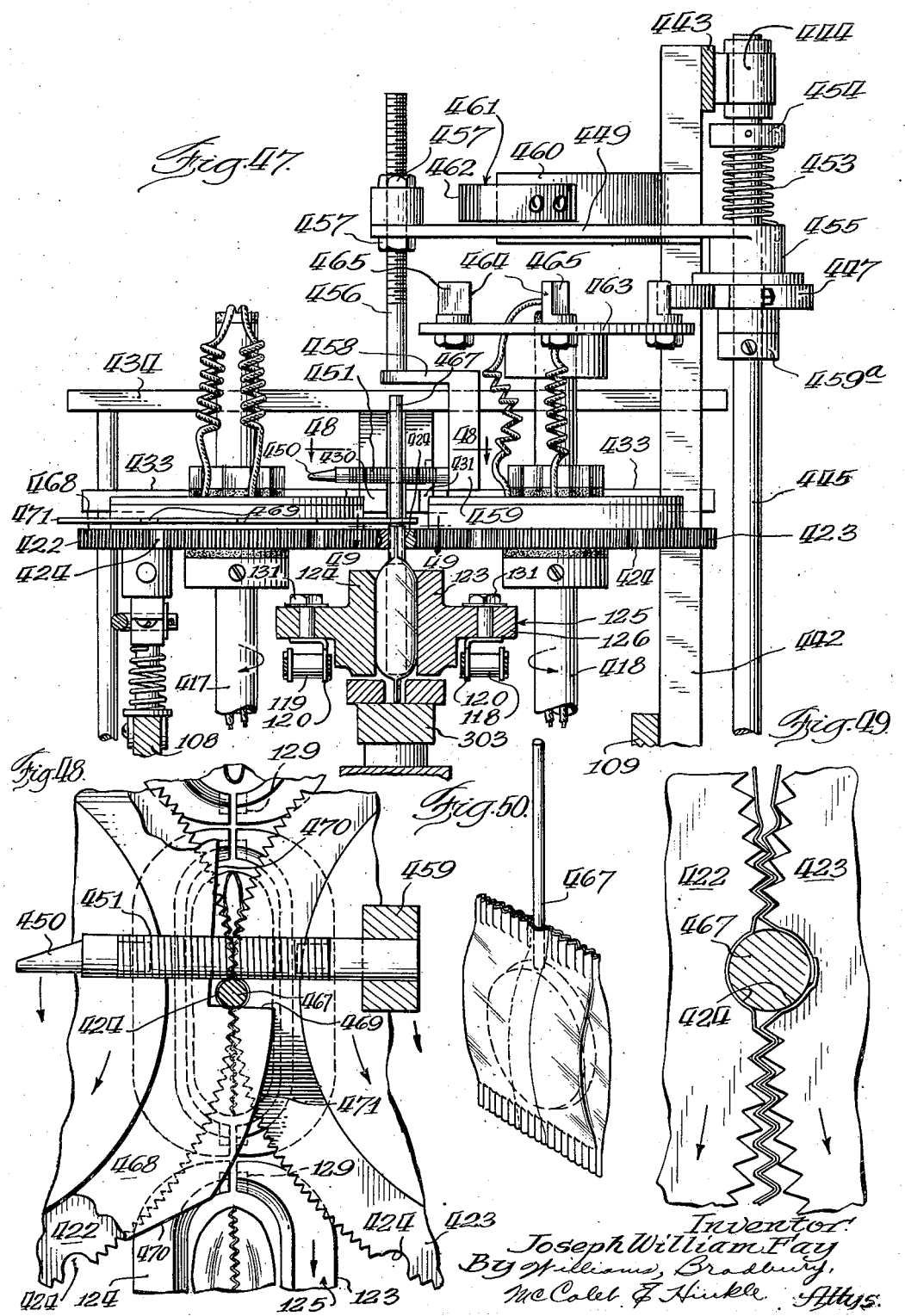

June 22, 1943.  J. W. FAY  2,322,430
MACHINE FOR PACKAGING EDIBLE PRODUCTS
Filed Nov. 16, 1939  24 Sheets—Sheet 22
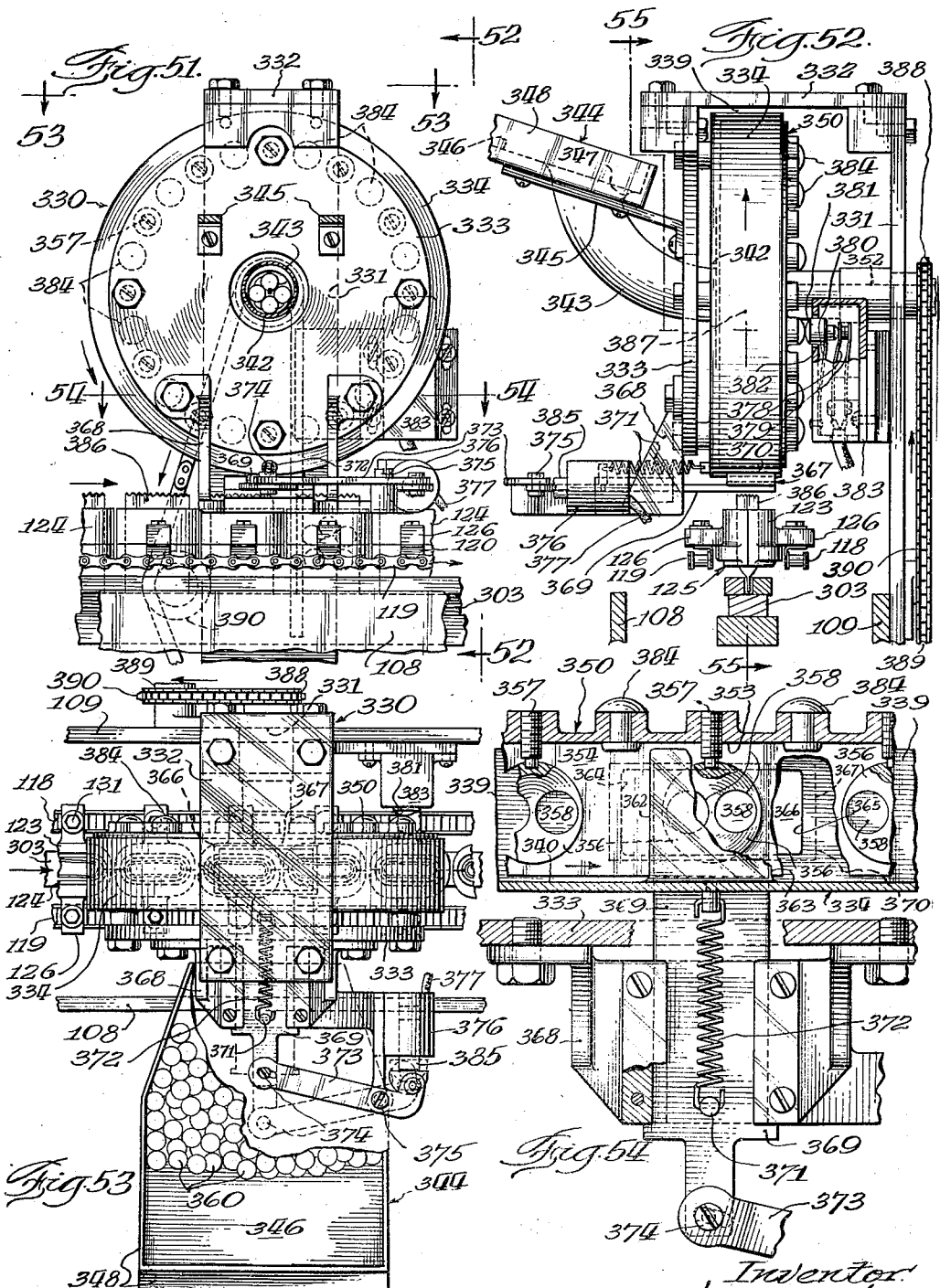

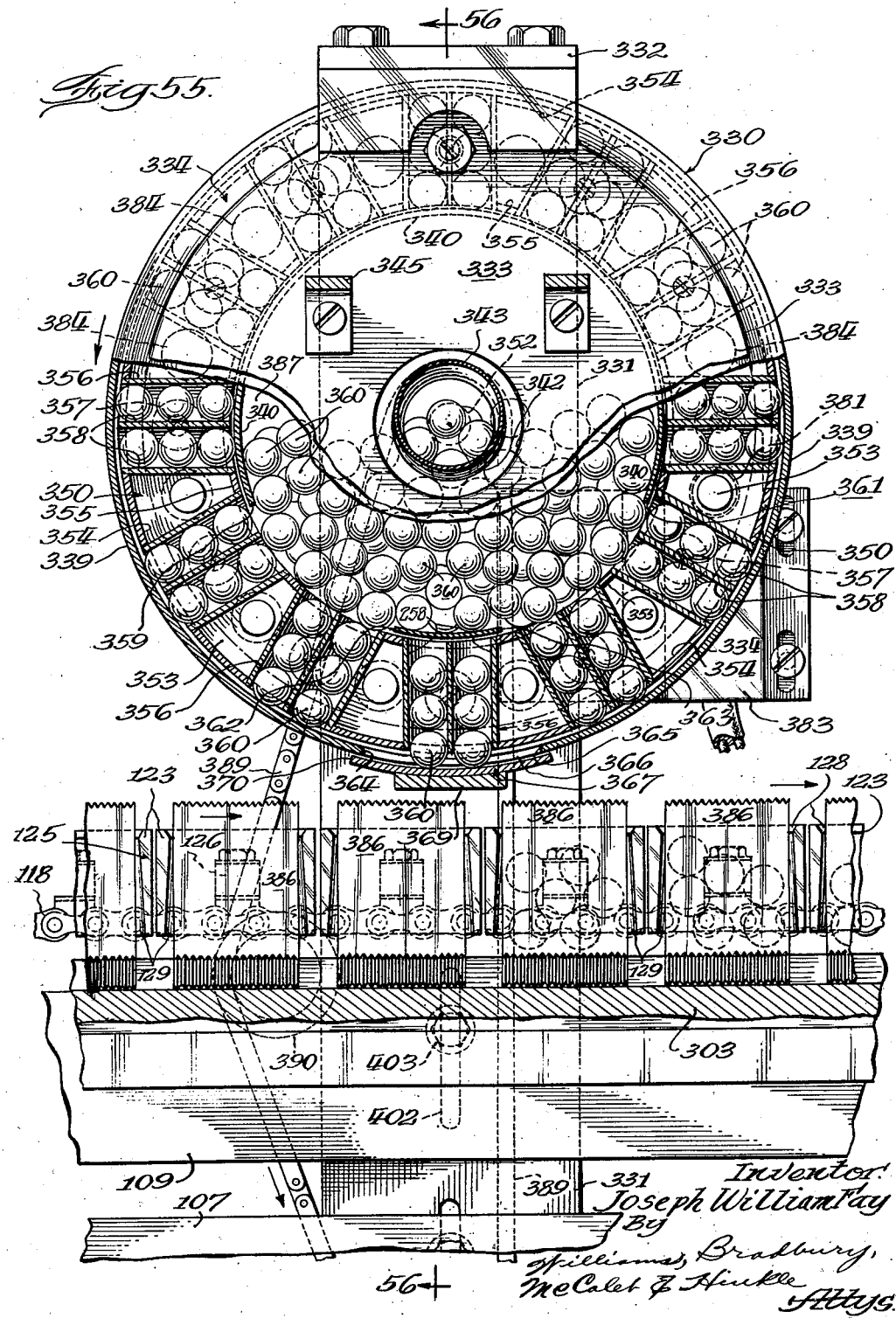

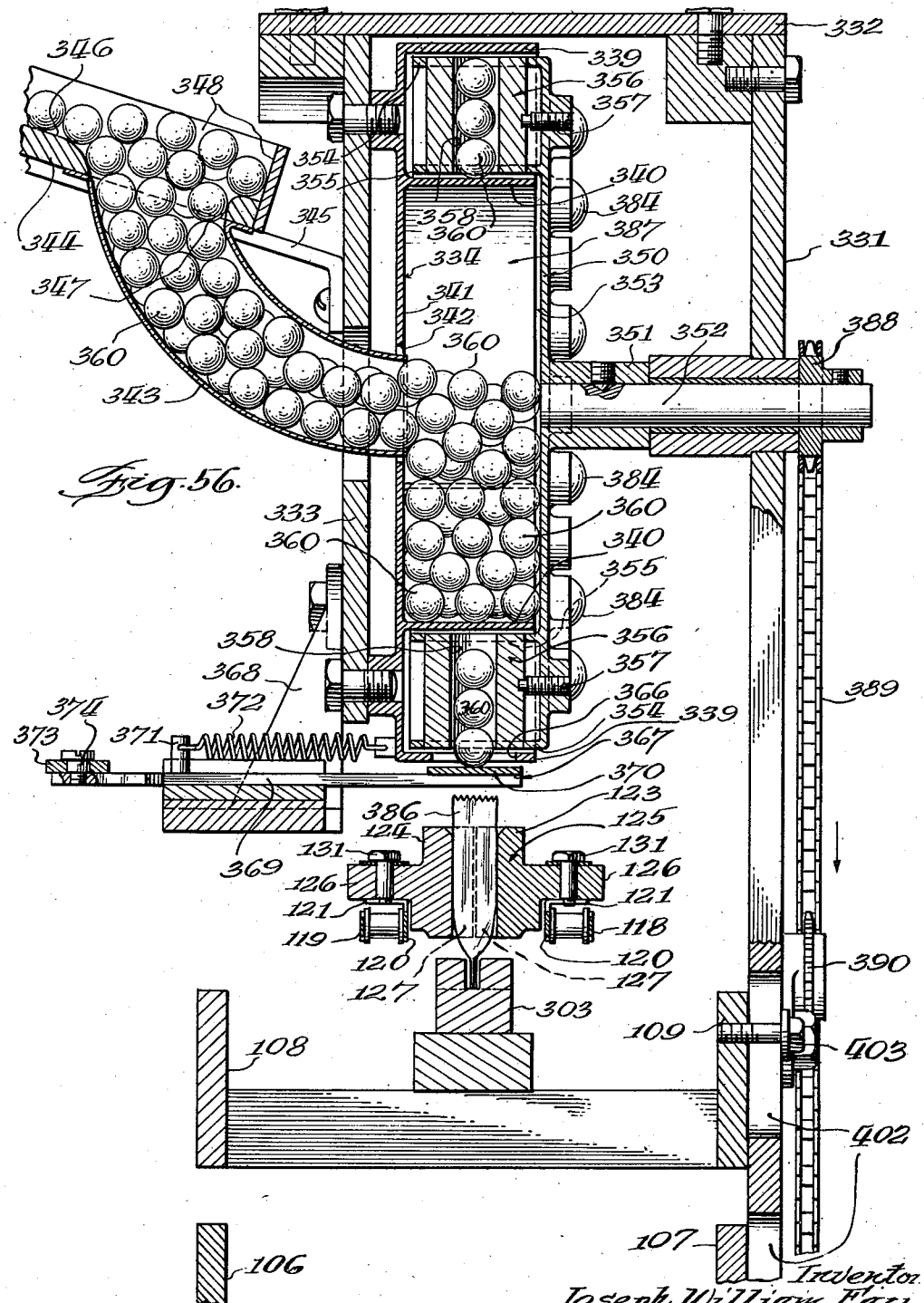

Patented June 22, 1943

2,322,430

UNITED STATES PATENT OFFICE 2,322,430

METHOD AND MACHINE FOR PACKAGING EDIBLE PRODUCTS

Joseph William Fay, Villa Park, Ill., assignor to Overland Candy Corporation, Chicago, Ill., a corporation of Illinois Application November 16, 1939, Serial No. 304,680

10 Claims. (Cl. 93—3)

The present invention relates to methods and machines for packaging edible products, and is particularly concerned with methods and machines relating to the packaging of candy or similar food products in a container of Cellophane or other transparent paper-like material.

One of the objects of the invention is the provision of an improved method and machine for enclosing candy or other confections in flexible, transparent containers, which is adapted to operate at a high speed and to maintain a much more efficient speed of operation than any of the devices of the prior art.

Another object of the invention is the provision of improved methods of packaging and machines for packaging, in which a multiplicity of the packages or containers are simultaneously disposed with one end open, so that a plurality of operators or filling devices may be used simultaneously for filling the packages in order to increase the speed of operation of the machines.

Another object of the invention is the provision of an improved method and machine for packaging confections in flexible, transparent containers, by means of which such flexible transparent containers may be manufactured out of sheet material, filled, and sealed in such manner that the confection is visible, but adequately protected against dampness or any other deteriorating factors.

Another object of the invention is the provision of an improved packaging machine of the class described for confections, which is also adapted to be used for enclosing the confection known as an "all day sucker," with the handle of the sucker protruding from the package.

Another object of the invention is an improved confection packaging machine of the class described, which is practically automatic and continuous in its operation so that manual labor is reduced to a minimum and so that the machine may be operated at a minimum amount of expense.

Other objects and advantages of the invention will be apparent from the following description and the accompanying drawings, in which similar characters of reference indicate similar parts throughout the several views.

Referring to the accompanying drawings, of which there are twenty-four sheets:

Figs. 1A and 1B together show a side elevational view of a machine embodying the invention;

Fig. 1A shows a side elevational view of an input end, or the left end of the machine;

Fig. 1B shows a side elevational view of the rest of the machine, that is, the output end; and when these two figures are arranged side by side, they show the complete machine.

Fig. 2 is an end elevational view, taken from the left end of Fig. 1A on the plan of the line 2—2 of Fig. 1A;

Fig. 3 is a side elevational view of the same end of the machine, which is shown in Fig. 1A, but taken from the opposite side of the machine;

Fig. 4 is a top plan view of the complete machine, partially broken away;

Fig. 5 is a larger fragmentary elevational view of the upper part of Fig. 2;

Fig. 6 is a larger end elevational view of the structure shown in Fig. 2, taken on the plane of the line 6—6 of Fig. 1A, which is located below that shown in Fig. 5, with parts of the mechanism in section, to show the details of structure;

Fig. 7 is a vertical sectional view, taken on the plane of the line 7—7 of Fig. 6, which is a plane extending longitudinally of the machine;

Fig. 8 is a larger sectional view, taken on the plane of the line 8—8 of Fig. 1A, looking in the direction of the arrows, showing the sealing mechanism for the bottom of the sack or package;

Fig. 9 is a top plan view of that part of the machine above the sealing mechanism for the lower end of the package, showing parts of the machine in section on the plane of the line 9—9 of Fig. 8 or the line 9—9 of Fig. 3;

Fig. 10 is a fragmentary sectional view, taken on the plane of the line 10—10 of Fig. 7, looking in the direction of the arrows, showing the plan view of the sealing mechanism for forming a tube out of a strip of "Cellophane" or similar material;

Fig. 11 is a sectional view, taken on the plane of the line 11—11 of Fig. 7, looking in the direction of the arrows, showing the details of structure of a device for aligning and centering the tubular "Cellophane" member on its feeding and cutting rolls;

Fig. 12 is a larger sectional view, showing the mechanism at a point just above the high speed package feeding rolls, and taken on the plane of the line 12—12 of Fig. 1A, looking in the direction of the arrows;

Fig. 13 is a larger sectional view, taken on the plane of the line 13—13 of Fig. 1A, looking in the direction of the arrows, showing the mechanism of the cutting rolls in plan;

Fig. 14 is a larger fragmentary plan view, taken on the plane of the line 14—14 of Fig. 1B, looking in the direction of the arrows, and showing the sealing mechanism for the upper end of the package and the means for assuring the alignment and proper handling of the projecting handles of "all day suckers" when they are packaged by the machine;

Fig. 15 is a vertical sectional view, taken on the plane of the line 15—15 of Fig. 14, looking in the direction of the arrows, showing the details of structure of the sealing mechanism for the upper end of the package and the arrangements for handling the sticks or handles of "all day suckers";

Fig. 16 is a larger fragmentary sectional view, taken on the plane of the line 16—16 of Fig. 7, looking in the direction of the arrows, and showing the succession of tube feeding rolls, cutting rolls, and package feeding rolls;

Fig. 16A is a smaller view, similar to Fig. 16, showing the parts in the position which they assume at another stage in the operation, after a package has been cut off from the tube, and during the time the package is being projected into the supporting bucket of the machine;

Fig. 17 is a larger elevational view, taken on the plane of the line 17—17 of Fig. 2, showing the details of structure of the sealing mechanism for making a tube out of a strip of "Cellophane" or other similar material;

Fig. 18 is a vertical sectional view, taken on the plane of the line 18—18 of Fig. 17, looking in the direction of the arrows, showing the details of structure of the supporting mandrel and cooling arrangements for preventing the mandrel from getting too hot;

Fig. 19 is a larger sectional view, taken on the plane of the line 19—19 of Fig. 17, looking in the direction of the arrows, and showing the flexible transparent material at the time when the strip is beginning to be formed into cylindrical shape;

Fig. 20 is a horizontal sectional view, taken on the plane of the line 20—20 of Fig. 3, looking in the direction of the arrows, showing the flexible transparent material at the stage at which it is practically cylindrical in form;

Fig. 21 is another horizontal sectional view, taken on the plane of the line 21—21 of Fig. 3, showing the now completely shaped cylindrical member of flexible transparent material, such as "Cellophane," together with the guiding means for assuring the proper rotative position of the overlapping ends of the tubular member so that they may be engaged by a heated sealing roll;

Fig. 22 is a fragmentary sectional view, taken on the plane of the line 22—22 of Fig. 17, showing the structure of the electrically heated sealing roll which is adapted to press the overlapping edges of the tubular member of "Cellophane" against the side of a mandrel to seal these edges together;

Fig. 23 is a fragmentary sectional view, taken on the plane of the line 23—23 of Fig. 22, showing the supporting mechanism for the sealing roll of Fig. 22, and the cam means which is provided for holding the sealing mechanism in operative or inoperative position;

Fig. 24 is a fragmentary sectional view, taken on the plane of the line 24—24 of Fig. 23, looking in the direction of the arrows, showing the details of structure of a pair of electrical slip rings and the plunger contacts which engage these rings to conduct current to an electrical heating element in the rotating sealing roll of Fig. 23;

Fig. 25 is a larger fragmentary sectional view, taken on the plane of the line 25—25 of Fig. 8, looking in the direction of the arrows, and showing details of structure of a clutch which may be used for stopping the tube feeding rolls;

Fig. 26 is a larger vertical sectional view, taken on the plane of the line 26—26 of Fig. 9, looking in the direction of the arrows, showing the details of structure of the supporting buckets and the heated sealing rolls for sealing the lower end of the package or container;

Fig. 27 is a fragmentary vertical sectional view, taken on the plane of the line 27—27 of Fig. 16, looking in the direction of the arrows, showing the details of structure of the rotating cutting rolls;

Fig. 28 is a fragmentary elevational view of the cut-off rolls as shown in Fig. 16, but in a more advanced position, just after a length of the "Cellophane" tube has been cut off, and while it is just being released by the cut-off rolls to be projected into a bucket by the high speed package feeding rolls;

Fig. 29 is an enlarged fragmentary sectional view, taken on the plane of the line 29—29 of Fig. 28, showing the details of construction and shape of the cutting blades;

Fig. 30 is a larger sectional view, taken on the plane of the line 30—30 of Fig. 7, showing the details of structure of a shaping member which temporarily collapses the walls of the length of tubular material just before it is received in a supporting bucket so as to eliminate any possibility of the edges of the "Cellophane" catching on the sides of the bucket.

Fig. 31 is a vertical sectional view taken on the plane of the line 31—31 of Fig. 18, looking in the direction of the arrows, showing the supporting mandrel upon which the "Cellophane" is formed into a tube, and showing the spreaders for shaping it suitably for insertion into the supporting buckets of the conveyor;

Fig. 32 is a horizontal sectional view, taken on the plane of the line 32—32 of Fig. 31, looking in the direction of the arrows;

Fig. 33 is a fragmentary enlargement of Fig. 32;

Fig. 34 is a fragmentary sectional view, taken on the plane of the line 34—34 of Fig. 18 and enlarged;

Fig. 35 is a fragmentary enlargement of Fig. 34;

Fig. 36 is a sectional view, taken on the plane of the line 36—36 of Fig. 31, looking in the direction of the arrows;

Fig. 37 is a sectional view, taken on the plane of the line 37—37 of Fig. 31, looking in the direction of the arrows;

Fig. 38 is a vertical sectional view, taken on the plane of the line 38—38 of Fig. 14, showing the details of structure of the sealing mechanism for the upper end of the package;

Fig. 39 is a fragmentary sectional view, taken on the plane of the line 39—39 of Fig. 38, showing the sealing mechanism in the act of effecting a seal on the upper end of the package;

Fig. 40 is a fragmentary enlargement of Fig. 39;

Fig. 41 is a plan view, taken on the plane of the line 41—41 of Fig. 43, showing the sealing mechanism for the upper end of the package and for handling the sticks of "all day suckers";

Fig. 42 is a fragmentary enlarged sectional view taken on the line 42—42 of Fig. 43, showing the resilient means for placing all of the handles of the "all day suckers" in the same position so that they may be handled by the mechanism;

Fig. 43 is a larger side elevational view, taken on the plane of the line 43—43 of Fig. 4, and showing the oscillating arm for handling the "all day sucker" sticks in the position of the dotted lines of Fig. 41;

Fig. 44 is a fragmentary sectional view, taken on the plane of the line 44—44 of Fig. 43, looking in the direction of the arrows;

Fig. 45 is a vertical sectional view, taken on the plane of the line 45—45 of Fig. 41, looking in the direction of the arrows and showing "all day suckers" in the act of being packaged;

Fig. 46 is a fragmentary view, similar to the upper right hand portion of Fig. 41, and showing the oscillating arm for handling the "sucker" sticks in position to push the "sucker" stick forward into the position which it assumes in the package;

Fig. 47 is a sectional view taken on the plane of the line 47—47 of Fig. 41, looking in the direction of the arrows;

Fig. 48 is an enlarged fragmentary sectional view, taken on the plane of the line 48—48 of Fig. 47, showing the action of the sealing rolls about the stick of an "all day sucker";

Fig. 49 is an enlarged fragmentary view of part of Fig. 48;

Fig. 50 is a view in perspective of the "sucker" completely sealed and enclosed in a "Cellophane" container;

Fig. 51 is a fragmentary vertical elevational view of the magazine feed, taken on the plane of the line 51—51 of Fig. 4;

Fig. 52 is a fragmentary end elevational view, taken on the plane of the line 52—52 of Fig. 51;

Fig. 53 is a fragmentary top plan view taken on the line 53—53 of Fig. 51 of the magazine mechanism for feeding the confection into the box or containers;

Fig. 54 is a fragmentary horizontal sectional view, taken on the plane of the line 54—54 of Fig. 51, looking in the direction of the arrows;

Fig. 55 is an enlarged sectional view, taken on the plane of the line 55—55 of Fig. 52, looking in the direction of the arrows, showing the details of structure of the magazine for depositing the confection in the box;

Fig. 56 is a fragmentary vertical sectional view, taken on the plane of the line 56—56 of Fig. 55;

Fig. 57 is a fragmentary sectional view taken on a plane passing through the axis of the assembly, showing the plunger contacts and slip rings for effecting an electrical connection between the rotating sealing rolls and the source of energization;

Fig. 58 is a fragmentary sectional view, taken on the plane of the line 58—58 of Fig. 1B, showing the arrangement of the nozzles for cleaning out the buckets;

Fig. 59 is an enlarged fragmentary sectional view, showing the shape and structure of the buckets;

Fig. 60 is a bottom plan view of one-half of a bucket, taken on the plane of the line 60—60 of Fig. 9;

Fig. 61 is a view of the "Cellophane" envelope, taken on the plane of the line 61—61 of Fig. 16A;

Fig. 62 is an enlarged sectional view, taken on the plane of the line 62—62 of Fig. 4, showing the temperature controlling bulb for maintaining the heated sealing rolls at a constant temperature.

*The method of packaging confections*

The present method of packaging confections involves the use of flexible transparent material, such as "Cellophane," which is adapted to be caused to have one part adhere to another by the application of heat.

The "Cellophane" may be in the form of a long strip on a roll, and the method contemplates the unrolling of such a strip and the curving of the strip along a longitudinal axis upon a mandrel by means of suitable guides until the strip assumes a substantially cylindrical or tubular form, with the edges of the strip overlapping sufficiently to form a seal.

Just before the application of heat to the overlapping edges, the strip in almost tubular form, with its edges almost abutting, but not overlapping, is guided rotatively of the mandrel so as to assure the location of the overlapping edges between the mandrel and a heated sealing roll.

As the strip progresses along the mandrel, its overlapping edges are compressed, heated, and rolled between the mandrel and a heated sealing roll, having a substantially cylindrical outer surface engaging the mandrel, and the application of a suitable degree of heat, causes the overlapping edges of the "Cellophane" tube to adhere to each other.

The method further contemplates the removal of the tubular member from the end of the mandrel by suitable means, such as the tube feeding rolls, which flatten and grip the tube and feed it at a predetermined rate between a pair of cutting rolls.

One of the cutting rolls is preferably provided with a groove, and the other with a serrated blade having a plurality of sharp points and sharp edges on at least one side of the blade and so timed that the blade of the one roll registers with the groove in the other roll.

The blade roll is preferably provided with a rubber gripping member, which grips the flattened "Cellophane" tube as it is fed between the cutting rolls, and the rubber gripping member is in advance of the blade so that the "Cellophane" is held taut at the time when it is engaged by the serrated teeth.

The method contemplates the penetration of the tubular "Cellophane" member by means of teeth, and thereafter the cutting of slits transversely of the tube by the blade until a short section of the tube of suitable length is easily torn from the tubular member.

At a predetermined time in the slitting of the tubular member transversely to its length, the rubber gripping member on the cutting rolls is adapted to pass out of engagement with the length of tube located below the slits, and the method contemplates the engagement of this length of the tubular "Cellophane" member by a feeding means which is moving at a high rate of speed.

This high speed feeding means is adapted to slide on the end of the tubular member until the rubber gripping member lets go, whereupon the friction between the end of the "Cellophane" tubular member and the high speed feed member is such that the high speed feeding members grip the short section of tube, tear it loose, and project it in the direction of one of a plurality of supporting buckets.

Thus the short length of "Cellophane" tube is torn off and inserted into a supporting bucket, which is adapted to support it until it has been formed into a bag, filled with the confection, and the open end has been sealed.

The present method contemplates the use of a multiplicity of supporting buckets coming successively into registry with the high speed feeding rolls and suitably timed so that each time a length of tubular "Cellophane" is torn off, a bucket is in proper place to receive it.

The buckets may consist of metal containers carried by a continuous chain or conveyor, preferably arranged in a horizontal position so that the tubular "Cellophane" members are adapted to be filled after the lower end has been sealed. As the buckets progress horizontally, with the short lengths of "Cellophane" tubular members in them, they come to a lower sealing mechanism, comprising a pair of toothed, heated metal rolls, which engage the lower end of the tubular "Cellophane" member, and simultaneously crimp, heat, and compress these ends so that the lower end of the tube is sealed. The crimping tends to shorten the transverse width of the container at its lower end and to permit the bag to bulge with greater facility at the center, to receive a larger supply of confection.

Thereafter the sacks so formed are carried onward in their supporting buckets on the conveyor, and they may be filled by hand or by means of an automatic mechanism supplied for that purpose. When filled by hand, the use of a multiplicity of different buckets, each carrying a sack, and located in horizontal position on the conveyor belt, facilitates the employment of a multiplicity of operators, so that the machine may operate at a very high speed, while a multiplicity of operators are placing confections in the buckets.

When operated automatically, one or more hoppers may be placed at predetermined points above the sacks in the buckets, so as to permit the discharge of the confection from the hopper into the sack carried by the bucket at the time the bucket is immediately under the hopper.

The hoppers or magazines for depositing the confection into the bags are preferably arranged in such manner that the confection may spread out on a relatively flat sloping surface when it is first discharged into the hopper for inspection of the confection and removal of any defective pieces.

Thereafter the confection is preferably received in a magazine provided with pockets for receiving a predetermined number of pieces or amount of confection so that each bag is filled with the same amount of confection.

The method next contemplates the sealing of the upper end of the bag by means of serrated engaging rolls, which are heated and adapted to crimp and press and heat the walls of "Cellophane" at the upper end of the bag to seal these walls together and close the container Thereafter, the buckets, which support the filled bags, may discharge the filled bags by means of gravity, when the conveyor passes over a sprocket at one end of the machine, and another conveyor may carry the filled bags up on a table for handling, or they may be discharged directly into suitable containers.

The parts of the bucket are preferably separated in the course of their movement to the feeding end of the machine so that the bucket may be cleaned of any candy or parts of a container that might adhere thereto.

The present method contemplates the sealing, not only of individual confections, such as candy balls or pieces of candy of any shape, popcorn, etc., but it also contemplates the sealing of "all day suckers" in transparent containers, which involves additional steps in the method of operation.

"The "all day suckers" are placed in the bags, after the bottom end has been sealed, with the sticks projecting upward out of the bags and buckets. The sealing rolls, which seal the upper end of the bag, are each provided with half-cylindrical grooves adapted to register and embrace the stick, while the serrated portions of the rolls on either side of the grooves is effecting a seal between the "Cellophane" of the bag.

In order to assure the registry of the sticks with the grooves of the sealing rolls, which are intended to receive the sticks, it is desirable to provide a suitable means for placing the sticks in the grooves of the sealing rolls.

This means may be made to operate best by first placing all of the sticks with their ends extending at the same angle. Therefore, the present method contemplates the arrangement of the "sucker" sticks at the same angle, and thereafter the placing of the sticks within grooves in sealing rolls that engage the upper ends of the bags and compress, heat, and seal them together about the sticks. When no sticks are used, that is, when the method is practised on ordinary pieces of candy, as distinguished from "all day suckers," the same sealing rolls may be used on the upper end, except that the operative portion of the roll is a continuously serrated part located between the grooves, and the grooves are so located that they do not engage the "Cellophane."

The method may be briefly summarized by stating that it comprises the formation of a tubular member of flexible transparent material, by shaping a strip into tubular form, with overlapping edges, sealing the edges of the strip together by the application of heat and pressure to form a tube, sealing the tube transversely at predetermined points to provide suitable lengths for the formation of sacks, tearing off suitable lengths at the slit points, and placing said sacks in a support, sealing the lower ends of said sacks by simultaneously crimping, pressing, and heating these ends, filling the sacks so constructed with a predetermined amount of confection, and sealing the upper end by simultaneously crimping, pressing, and heating the upper ends.

In the case of the enclosure of "all day suckers" in the packages, the method contemplates the additional steps of locating the handle of the "sucker" at a predetermined point in the upper end of the container, and thereafter simultaneously crimping, pressing, and heating the adjacent portions of the open end of the bag about the stick, to effect a seal and closure of the container.

The present method may be carried out by hand with suitable forming tools of relatively simple nature, such as mandrels, heated irons, or heated rolls, and suitable cutting and supporting devices, but it is preferably carried out by means of an automatic machine, such as that which is illustrated in the accompanying drawings, and which is peculiarly adapted to carry out all of these operations with a minimum amount of manual labor.

Referring to Figs. 1A, 1B, 2 and 3, these figures show the assembly of such a machine embodying the invention, the important parts of which will now be described in detail.

The two Figures 1A and 1B should be placed side by side, and the broken portion at the right of Fig. 1A and left of Fig. 1B represents a duplication, but the combination of these two figures illustrates the complete machine assembly.

The machine is preferably supported upon a suitable frame, which may consist of a pair of bases 100, 101, each base having a pair of upwardly extending columns 102—105.

These columns may consist of substantially rectangular steel shafts, the upper ends of which are made cylindrical and threaded for the support of other frame members.

The columns 102, 104 and 103, 105 are joined by the longitudinally extending steel frame members 106, 107 and 108, 109, respectively; and the columns 104, 105 and 102, 103 are also joined by suitable cross-heads 110, 111, 112 (Fig 2), and by similar cross-heads at the top end of the machine, that is, the right hand end of Fig. 1B. Suitable bearings 113 and 114 are carried by each of the columns 102, 103, 104, 105, opposite each end of the frame, for supporting the sprocket shafts 115, 116, one being at each end of the machine for rotatively supporting a pair of sprockets 117 at each end of the machine. (See Fig. 6.)

The sprockets 117 are fixedly secured to the shafts 115, 116 and are adapted to support a pair of continuous chains 118, 119, in parallel relation to each other, at the top of the frame.

The chains 118, 119 may be of a type similar to the sprocket chain of a bicycle, except that predetermined of the connecting links are provided, as shown in Fig. 16, with an upwardly extending flange 120, having a horizontally extending portion 121, provided with a threaded bore 122.

These flanges 120 are used to support the halves 123, 124 of a bucket, indicated in its entirety by the numeral 125. The bucket halves 123, 124 are identical in shape, but reversed in position, and may be made of cast metal, and are shown in further detail in Figs. 59 and 60.

Each bucket has a horizontally extending supporting lug 126 and a body, which has a pair of inwardly projecting flanges 127, embracing a vertical groove, so that when two buckets are arranged side by side, they form a container which is open at the top and bottom.

The upper opening of each bucket 125 has its corner chamfered, as at 128, to facilitate guiding the sacks into the bucket.

Referring to Fig. 60, it will be seen that there is a tapered groove 129 formed in the adjacent flanges 127 of each bucket, so that the buckets are enlarged at the bottom (Fig. 59). The purpose of this is to provide greater room for the flattened sack, which tends to be longer at the bottom, and to facilitate the release of the packaged confection from the bucket when the operation has been completed. The position of the "Cellophane" container 130 in the bucket is shown in dotted lines in Figs. 59 and 60.

The halves 123, 124 of the bucket may be secured to the flanges 120 of the chain lengths by screw bolts 131 in such manner that when the chains 118, 119 are on the sprockets 117, the two halves of the bucket are brought into close engagement with each other to form a supporting container for the "Cellophane" bags 130.

The sprockets 117 (Fig. 1A) rotate in a clockwise direction, and thus the buckets 125 progress from the left or feeding end of the machine, in Fig. 1A, toward the right or top end of the machine in Fig. 1B.

The chains 118, 119 are suitably supported intermediate of the sprockets 117 at each end of the machine by a multiplicity of idler sprockets 132.

These idler sprockets are carried by the side frame members 109, 108, which have the inwardly projecting stub shafts 133 (Fig. 15), which support the sprockets on the side frame members 109, 108 in spaced relation to each other, as shown in Fig. 15.

The endless chains 118, 119 pass around the sprockets 117 and over the sprockets 132, and downward underneath the machine at each side, under a pair of sprockets 134. The sprockets are carried by stub shafts 135 (Fig. 58, Sheet No. 10), which are shorter, and which are supported by the depending adjustable frame members 136 carried by the side frame members 106, 107. The stub shafts 135 are shorter, so that the bucket halves 123, 124 are drawn apart at this point, and a pair of downwardly extending nozzles 137 are directed at the two bucket halves in such manner that discharging compressed air is adapted to clean out the grooves in the buckets and assure the removal of any pieces of candy or "Cellophane" or defective bags at this point.

The chains may be tightened and adjusted by means of the slot 138 and bolt 139 (Fig. 1A). The conveyor, which comprises the sprocket chains and buckets, may be driven from the shaft 116 by means of an extension of the shaft and the sprocket 140, carried thereby (Fig. 1B), which is engaged by a chain 141, which is driven by a variable speed transmission, which is in turn driven by a suitable electric motor.

An auxiliary continuous conveyor belt 143 may be supported under the right end of the machine (Fig. 1B) upon suitable rolls, and driven by means of auxiliary chains and sprockets 145, 146 and 147, so as to carry the discharging packages 150 from the discharge end of the machine, which is the right end of Fig. 1B.

Referring now to Fig. 1A, Figs. 2 and 3, the left or feeding end of the machine in Fig. 1A is provided with mechanism for forming a tubular "Cellophane" member that is cut into lengths and later formed into the bags for containing the confection.

This mechanism may be supported upon the columns 104, 105 by means of a suitable plate or cross-head 112 (Fig. 2). This plate or cross-head has apertures for receiving the threaded ends of the columns 104, 105, and, like the cross-heads 110, 111, the plate 112 may be adjustably supported at a suitable height by virtue of the clamping screws on the columns 104, 105, which permit vertical adjustment.

The plate 112 (Fig. 8) may be of a shape similar to the cross-heads 110 and 111, that is, widened at its central part between the supporting standards 104, 105.

At points diametrically opposite from each other, and midway between the columns 104, 105, the plate 112 supports a pair of cylindrical steel columns 151, 152 (Fig. 1A). The columns 151, 152 are likewise joined by a plurality of cross-heads 153, 154, 155 for the purpose of securing these columns together and providing a rigid frame.

Each of the cross-heads has apertures for receiving the columns 151, 152 and set screws for securing the columns in said apertures. The uppermost cross-head 153 is secured by angles 156 to the ceiling for additional bracing. Crosshead 153 may be provided with a pair of depending flanges 156, having bearings for a pintle, which supports an idler spool 157, over which a strip 158 of "Cellophane" passes.

The "Cellophane" itself may be carried upon a spool 159, which is carried by a pintle 160 rotatably mounted in a pair of upwardly extending arms 161 carried by bracket 162.

A brake shoe 163, provided with a leather facing 164, engages the roll of "Cellophane" on the spool 159, and maintains the strip taut. Brake shoe 163 is urged into engagement with the roll by means of a spring pressed plunger 165 slidably mounted in guides and engaged by a spring 166.

The cross-head 154 is adapted to support the upper end of a tubular metal member 158a, which forms a part of a mandrel used for shaping the strip of "Cellophane" into tubular form. The member 158a comprises a standard metal pipe of suitable size, the lower end of which is fixedly secured to an enlargement 159a, which is of the size of the desired tubular member.

The pipe 158a is carried by a bracket 160a, having an arm projecting laterally into engagement with the cross-head 154. The cross-head 154 is located oppositely to the delivery of the "Cellophane" strip from the idler roll 157 so that it will be on the open side of the partially formed tubular member of "Cellophane."

The pipe 158a is provided with a suitable connection 161a for the discharge of cooling liquid, such as water (see Fig. 18), which is led into the pipe 158a by means of an inner tube 162a and carried to the lower end of the pipe, where it is discharged from the end 163b into the bore 164a of the pipe.

The lower end of the mandrel or enlargement 159a has its bore 164a closed with a screw plug 165a, and thus the water is directed upwardly and about the tube 162a, and is discharged through the fitting 161a.

The pipe 158a is preferably supported in such manner that it may swivel freely, and therefore the bracket 160a has an enlarged aperture 166a surrounding the pipe 158a, and it may have a counterbore 167 for receiving the lower race of an anti-friction bearing 168.

Nuts 169 above the bearing and a nut and plate 170, 171 below the bearing are suitably adjustable so that rotative movement is permitted, and thus the cylindrical mandrel 159a is adapted to rotate to maintain a partially cylindrical surface 172 in engagement with the outer cylindrical surface 173 of the heated sealing roll 174.

The strip of "Cellophane" 158 is drawn downward over the idler roller, and due to its being properly started in cylindrical shape by the sealing roll 174, it is drawn about the mandrel 159a, and its edges are overlapped at the time it is passing over the partially cylindrical surface 172, and is engaged by the cylindrical edge 173 of the sealing roll, by the application of heat and pressure, the overlapping edges of the "Cellophane" are caused to adhere together, but the mandrel 159a is cooled by the circulation of water internally thereof so that the rest of the tubular "Cellophane" member 158 is not sufficiently heated to cause it to adhere.

For the purpose of guiding the "Cellophane" about the mandrel 159a, the upper end 175 of the mandrel 159a is rounded off and surrounded by a funnel shaped member 176, which tapers from its large and open upper end to a suitable clearance between the internally cylindrical bore 177 at its lower end.

The funnel 176 is carried by a sleeve 178, the radially extending flange 179 of which extends on a rubber gasket 180, and is carried in a bore in a boss 181, which is integral with the cross-head 155.

Fig. 19 shows the "Cellophane" strip 158 as it is beginning to be shaped into cylindrical form at a point above the funnel 176.

Fig. 20 shows it as it is practically in cylindrical form, and Fig. 21 shows the tubular member just before it reaches the sealing surface 173, its opposite edges being guided by engagement with a guide member 182.

The guide member 182 assures the proper rotative position of the tubular "Cellophane" member on the mandrel 159a so that its overlapping edges will come between the surface 172 and 173.

Guide member 182 comprises a bent metal rod which is carried by one of the standards 151 (Fig. 3) by means of a sleeve 183, and which has the inwardly bent end 182, located in alignment with the sealing roll 174.

The disc 184 (Fig. 21) will engage the edge of the "Cellophane" and force it inward in the event the misalignment becomes very bad.

*The tube sealing mechanism*

The heated sealing roller 174 is rotatably mounted on a shaft 190, which is carried by links 191, pivotally mounted at 192 on plate 155a attached to cross-head 155 (Fig. 18).

A cam shaft 193 is carried by suitable bearings 194 on the standards, and has a cam 195 and a lever 196. Shaft 190 is provided with a roller 197 at one end for engaging in the hollow spaces 198 or 199 on cam 195, and when the cam is in the full line position of Fig. 23 the heat sealing roll is withdrawn from engagement with the mandrel 159a.

This may be accomplished by means of the hand lever 196 when the machine is not operating, to prevent the application of too much heat.

A second set of links or levers 200 is also pivotally mounted on the shaft 192 (Fig. 23), and are joined by a strip 201, the end of which carries an insulating body 202 (Fig. 17) for supporting a pair of plunger brushes 203, 204.

The plunger brushes 203, 204 serve to conduct electrical current to the slip rings 205, 206, respectively, carried by an insulating cylindrical member 207, which is mounted on the shaft 190.

The shaft 190 may be hollow so that conductors 208, 208a may be connected to the slip rings 205, 206, and may pass into the shaft at 209, 210 (Fig. 22) and emerge from the shaft at 211 for connection to suitable terminals 212 of an electrical heating element, which is contained within the sealing roll 174.

Thus the spring-pressed plungers 203, 204 may be the fixed terminals to which a source of current supply is attached to bring current to the moving or rotating heated sealing roll 174.

The circuit preferably includes suitable relays and controlling apparatus whereby the temperature of the sealing roll 174 is maintained substantially constant by controlling the temperature with a thermostatic device 213, comprising a gaseous bulb mounted in a block 214, which is carried by an arm 215 fixedly secured upon the strip 201.

The metal block 214 has a cylindrical surface 216 slidably engaging the outer cylindrical surface 173 of the sealing roll 174 so as to receive heat by conduction and radiation, and the block 214 is drawn against the sealing roll by a spring 217 (Fig. 17).

The spring 217 is attached to a cross-bar 218 at one end, and the other end is secured to cross-head 112 (Fig. 2). Thus the spring 217 draws the metal block 214 and the thermally responsive bulb 213 into engagement with the heat sealing roll, and this member in turn forces the sealing roll into engagement with the "Cellophane" and braces it against the mandrel 159a.

When the cam 195 is actuated to move the sealing roll out of engagement with the "Cellophane," the roll is still maintained at a suitable temperature by the thermostatic control, which still engages the roll, and of course the heating element is more frequently disconnected from the circuit when heat is not being used, but the roll is at all times at the proper temperature for use.

Fig. 37 shows the relatively flat condition of the tubular member, which will be indicated by the numeral 227, as it passes off the guide members 223 in condition to be engaged by feed rolls.

Referring to Fig. 16, this is an illustration of the feed rolls, which now engage the flattened tubular "Cellophane" member 227 and successive cutting rolls, and high speed feed rolls, which also act upon it.

The uppermost feed rolls 228, 229 may consist of cylindrical members of sufficient width to engage the flattened tube, one of which, 229, is formed of steel, and the other of which, 228, is provided with a rubber cover.

The rubber cover is of relatively smooth medium soft rubber, adapted to have a good traction engagement with the tubular "Cellophane" member 227, and the feed rolls 228 and 229 rotate in opposite directions, as indicated by the arrows in Fig. 16, to draw the tube downward, as they are the members which determine the speed of motion of the "Cellophane" through the mechanism of the machine, which has been described so far.

From the feed rolls 228, 229, the tubular "Cellophane" member 227 passes through a pair of cutting rolls 230, 231, which may be constructed of steel, except for the fact that a slot 232 in a blade roll 231 is provided with a projecting soft rubber plug 233.

The roll 230 has a groove 234, of substantially rectangular cross-section, extending fully across the roll, and adapted to receive the cutting blade 235, which is secured upon a flat bed 236 by screws 237 on the blade roll 231.

The blade 235 is thus adapted to project into the groove 234, but is not engaged by any part of the roll 230, and the cutting action is by projection of the blade through the "Cellophane" without any interengagement between the blade and other metallic parts. Thus the blade may be used for a long period of time without resharpening, since it engages only the "Cellophane."

The projecting rubber plug 233 is adapted to engage the "Cellophane" tubular member 227, and tension it at the time the blade is acting, and also to hold the partially severed portion 238 of the tubular "Cellophane" member 227, until a predetermined point in the cutting cycle has been reached.

The feed rolls 228 and 229 are fixedly secured to drive shafts 239, 240, and cutting rolls 230 and 231 are fixedly carried by drive shafts 241, 242, respectively.

Referring to Figs. 27 and 29, these are illustrations which show the structure of the blade and its action. The blade 235 has a plurality of triangular toothed formations 243 on its cutting edge, and one side 244 of each tooth may be flat and without an especially sharp edge. The other side of each tooth 243 is beveled at 246 and provided with a sharp edge at 245, which ends in a sharp point at 247.

Referring to Fig. 28, it will be seen that as the cutting rolls rotate, the sharp points 247 are projected into the groove 234 through the tensioned "Cellophane" tube 227, which is in flat condition.

The action taken is such that the points 247 penetrate and thereafter the edges 245 cut slits in the "Cellophane," but there is a portion between these slits, which may be represented by the space occupied by the flat sides 244 of the blade that may be torn rather than cut.

The tubular "Cellophane" member is thus provided with aligned spaced slits, at least in the preliminary stages, and finally completely cut in two when the blade projects through the "Cellophane," as shown in Fig. 28. At this time, however, the rubber block 233 comes into position to release the "Cellophane" member 238 below the cutting rolls, and another part of the mechanism comes into action to tear or sever the member 238 from the continuous tube 227.

This latter part of the mechanism comprises a pair of high speed feeding rolls 248, 249 mounted on shafts 250, 251 (Fig. 16) and formed of steel, but provided with an outer smooth medium soft rubber covering for engaging the length of "Cellophane" at 238. These high speed rolls are driven at a much faster speed than either the feeding rolls 228 or 229, or the cutting rolls 230, 231, and up to the time that the "Cellophane" member 238 is released by the rubber block 233, as shown in Fig. 28, the high speed feeding rolls 248, 249 slip on the "Cellophane" and tension it, but are ineffective to move it, except as permitted by the feed rolls 228, 229.

For example, the high speed rolls 248, 249 may be driven eight times as fast as the feed rolls 228, 229, or at approximately 3,000 R. P. M.

The result is that the severed length of tubular "Cellophane" 238 is momentarily held by the rubber block 233, while it is being cut by the blade 235, and thereafter quickly severed and projected with considerable speed through a shaping member 260, carried by a plate 261. The spur gear 249a secured to shaft 251 of the high speed feed roll 249 drives the spur gear 248a synchronously, which is secured to the shaft 250 of the high speed feed roll 248.

The shaping member 260 has a pair of inwardly extending tapered ribs 262, which tend to flatten out the tubular member 238, and assure its being of small enough size to be projected into the bucket 125, carried by the chains 118, 119. (See Fig. 16.)

Referring to Fig. 7, the shaping member 260 is there shown in section.

Referring to Fig. 30, the shaping member 260 is there shown in plan, with a tubular length 238 of "Cellophane" inside it engaged by the ribs 262.

Referring to Fig. 7, the machine is also preferably provided with a guide means 263 for assuring the centering of the tubular member on the feed rolls, which may comprise on elongated adjustable rod 264 provided with a tube 265 at its inner end for engaging the edge of the "Cellophane" tube at the guide members 223.

The feed rolls 228, 229 are preferably controlled by means of a suitable clutch 266 (Figs. 7 and 8) so that the feeding of the tubular material may be stopped at any time for repairs or adjustment of the machine, while the conveyor is still operating.

The drive of the feed rolls is carried from one of the conveyor shafts 115, as shown in Fig. 1A, as follows: One end of the conveyor shaft 115 is provided with a spiral gear 267, engaging a spiral gear 268 on a longitudinally extending shaft 269.

The shaft 269 has a sprocket 270 (Figs. 1A and Fig. 7), which drives a chain 271, and a smaller sprocket 272 carried by shaft 273. The shaft 273 is connected to shaft 242 by a pair of angular adjustment plates 275 so arranged that the timing or feed and timing of the knife may be adjusted as desired by varying the angular positions of the shafts 273, 242.

The shaft 242 carries one of the cutting rolls 231 and is provided with spur gear 274 for engaging a similar spur gear 276 (Fig. 13) on shaft 241. Thus the two cutting rolls are driven together in synchronism so that the groove 234 will always register with the blade 235. At its opposite end, shaft 242 has a pinion 277 (Fig. 13 and Fig. 8), which engages (Fig. 8) an idler gear 278 carried by a stub shaft on an adjustable pivoted arm 279, adjustably mounted on bolt 280.

The idler gear 278 engages the pinion 281 (Fig. 8), which has a clutch plate 282 provided with longitudinally extending lugs 283 (Fig. 25) for engaging similar lugs 284 on the clutch collar 285.

The clutch collar 285 is connected by a spline 286 and groove 287 to the feed roll shaft 240. The collar is driven into engagement with clutch plate 282 by a spring 288, but may be moved out of engagement by means of a pivoted lever 289, which is forked at one end and provided with pins 290 engaging in the groove 291 of the clutch collar 285.

The lever 289 is preferably provided with means for latching it with the clutch out of engagement, shown in plan in Fig. 12, and in elevation in Fig. 1A.

This latch comprises a latching member 290a, pivotally mounted at 291a on angle bracket 292 carried by the frame.

It will be seen that when the lever 289 is moved toward the right in Fig. 1A, the latch 290a may drop down behind it, the lever engaging the end of the latch to hold the clutch out of engagement on the drive.

The feed roll shaft 240 supports one of the feed rolls 229, and is provided at its opposite end with the spur gear 293 engaging spur gear 294 so that the feed roll shaft 239 is driven at the same speed and in synchronism for supporting the feed roll 228.

It should be noted that in Fig. 7 the spur gears 274 and 249a are not in engagement with each other.

The shaft 239 is provided with a small sprocket 295 (Fig. 12 and Fig. 7) for driving a chain 296, which drives a sprocket 297 (Fig. 6 and Fig. 2) carried by the shaft 190. The shaft 190 carries the sealing roll 174, previously described, so that the sealing roll is rotated in synchronism with the movement of the tubular "Cellophane" member which it forms.

Thus it will be seen that the upper sealing roll, the feed rolls, and the cutting rolls are all driven in synchronism by suitable sprockets and chains from one of the conveyor shafts.

The high speed feed rolls 248 and 249 are driven by a separate electric motor.

For this purpose shaft 251 is provided with a V pulley 298, engaged by a V belt 299, which also engages the V pulley 300 (Fig. 7). The V pulley 300 is carried by a motor shaft 301 driven by a high speed electric motor 302, having suitable arrangements for varying its speed as desired.

Thus the operation of the high speed feed rolls 248 and 249 is entirely independent of the other feed rolls. The high speed feed rolls thus take hold of the short length 238 of "Cellophane" tube and project it into the buckets 125.

At the left end of the machine in Fig. 1A, it will be seen that the conveyor moves toward the right, carrying these tubular "Cellophane" members along in the buckets, while they are being supported at the bottom by a longitudinally extending bar or rail 303 (Fig. 7).

The bar 303 is sufficiently narrow (Fig. 8) to pass between the lower parts 304 of a pair of lower sealing rolls 305, 306 (Fig. 8). These sealing rolls are similar in construction to the machine described in Fig. 22, being mounted on hollow shafts 307 and 308, and provided with suitable heating elements and conductors leading to the slip rings 309, 310, carried by insulating body 311 and engaged by plungers 312.

The sealing rolls are maintained at constant temperature by similar thermostatically controlled arrangements (Fig. 62), comprising a gas bulb 313 mounted in a metal block 314 pivotally carried by an arm 315, which is mounted at 316.

The block 314 slidably engages the upper face of one of the sealing rolls 305, and is spring-pressed downward by a spring 317, the other end of which is engaged by arm 318 fixedly mounted on the frame. The sealing rolls 305 comprise a pair of metal toothed wheels, the teeth being angular in shape, as shown in Fig. 48, which relates to the upper sealing rolls.

As these teeth engage each other, they compress between them and crimp and heat the adjacent lower ends of the flattened tube, as shown in Fig. 9, and crimp and seal these ends together to form a bag which is closed at the bottom, as indicated in Fig. 9.

It should be noted that the lower sealing rolls 305, 306 have their shafts 307, 308 driven by bevel gears 322, 323, 324, 325, from the transverse shaft 326, which has a sprocket 327 driven by chain 328 from sprocket 329.

The sprocket 329 may be mounted on the other end of conveyor shaft 115. The sealing rolls are thus continuously driven with the operation of the conveyor.

Referring to Fig. 1A, numeral 330 indicates in its entirety a filling magazine which is adapted to place a predetermined number of pieces of confection, such as candy, popcorn, or the like in each bag. This magazine is shown in greater detail in Figs. 51-56. It may be supported upon the side frame member 109 by means of an upwardly extending frame member 331, having a horizontally extending frame member 332 and a depending frame member 333.

The depending frame member 333 (Fig. 56) fixedly supports a housing member 334 of substantially cylindrical shape, having a pair of annular walls, such as the outer wall 339, and the inner annular wall 340, both supported from the back wall 341.

The back wall 341 has a centrally located aperture 342 for receiving the down spout 343 carried by an inspection table or hopper 344.

This inspection table or hopper is carried by an angle bracket 345 on the depending frame member 333, and it is best shown in Fig. 1A and Fig. 4 and Fig. 53. It comprises a rectangular shallow box, the floor 346 of which slopes toward the down spout opening 347 (Fig. 56), and the border flange 348 of which surrounds the floor 346 and tapers toward the down spout opening 347.

The hopper is shallow in order that a multiplicity of the pieces of confection may be laid out in one layer and inspected so that defective pieces may be removed by the operator before they reach the down spout 343, through which they move into the magazine 330.

The magazine housing 334 is fixedly supported on the depending frame member 333 and is adapted to receive a rotating member 350, which has its hub 351 fixedly secured to the drive shaft 352.

The rotating member 350 comprises a circular plate 353, which at its outer end carries a pair of annular flanges 354, 355, spaced sufficiently so that they may be rotatively received between the walls 339 and 340; that is, the rotatable member 350 is rotatably mounted upon an axis which passes through the axis of the housing 334.

The flanges 354, 355 are formed with a multiplicity of registering radial apertures for receiving the measuring members 356, which are held in place by set screws 357.

Each measuring member comprises a cylindrical metal member (Fig. 54) provided with a pair of axially extending cylindrical bores 358. The bores 358 are large enough in diameter to receive the confection, such as the candy balls 360. They are long enough to receive a predetermined number, such as, for example, three and six, each of the measuring members 356 being adapted to hold six candy balls in the example of Fig. 55.

The enlarged flange 340, as may be seen in Fig. 55, is continuous from the point 359 at the left to the point 361 on the right, but is open between the points 359 and 362 and the points 361 and 363.

The short portion between the points 362 and 363 is necessary to prevent both ends of the bores 358 from being opened at the same time. Thus the short portion 362, 363 of the enlarged flange 340 is located at the bottom side of the magazine so that it overlies the bores 358 of the members 356 when they are in that location and when the particular member 356 is in position to discharge its confection.

The external enlarged flange 339 extends all the way around the magazine from the point 364 to the point 365 at the bottom, having an opening 366 between these points for effecting a discharge of the confection when a sliding gate 367 is moved to the open position.

The sliding gate 367 (Fig. 56) may be supported upon an angle bracket 368, and may consist of a metal bar 369, having at one end a curved metal member 370. The curved metal member 370 is concentric with the peripheral flange 339 and is adapted to fit a substantial closure of the aperture 366 (Fig. 55).

The bar 369 has an upwardly extending pin 371 and secured thereto is one end of the spring 372, the other end being secured to a pin carried by the housing 334. Thus the gate 370 is urged to closed position, but it is adapted to be actuated by a bell-crank lever 373 (Fig. 53), which is pivotally and slidably connected at 374 to the bar 369.

The bell-crank lever is pivotally mounted on the frame at 375 and has its opposite ends slidably and pivotally connected to a solenoid 376, the conductors 377 from which are connected to the switch contacts 378, 379 (Fig. 52).

The switch contacts 378, 379 are normally in open position, due to their resiliency and tendency to spring apart, and the spring support members are stronger than the spring 380, which supports a push button 381 projecting through an aperture 382 in the switch housing 383.

The push button 381 is disposed adjacent the right face (Fig. 52) of the rotating member 350, which has a plurality of camming buttons 384 disposed in a circle on that face, in position to engage the push button 381 of the switch. Thus the switch 378, 379 is adapted to be closed periodically, as the rounded buttons 384 engage the push button 381 and close the switch contacts to energize the solenoid 376, which has a plunger 385.

The camming buttons 384 are so arranged that when a bag 386, carried by a bucket 125, comes directly beneath one of the confection-receiving members 356, the switch circuit is closed, and the solenoid actuated to open the gate 370. In fact, in the fast operation of the machine the gate may be opened slightly before the bag reaches a position of registry, in order to allow for the time necessary for the confection to drop the short distance from its container 356 into the bag 386.

The candy is placed in the hopper 344, whence it moves down through the spout 343 into the chamber 387 and is discharged by gravity into the members 356 at both sides, through the apertures between the points 359, 362 and the points 363, 361.

Should the magazine members 356 not be filled through the first of these openings, it will certainly be filled when the magazine again comes into registry with the second of these openings.

The rotatable member 350 is adapted to be actuated by means of the shaft 352, which carries a sprocket 388, driven by chain 389, which extends over the adjustable idler sprocket 390, and about a sprocket 391 on shaft 392.

The sprocket 393 engages the chain 394, which engages the sprocket 395, carried by the shaft 396, having a gear 397 for engaging a gear on shaft 326. Shaft 326 carries a sprocket 327, engaging chain 328, which engages a sprocket 329 on the conveyor shaft 115 (Fig. 3).

These arrangements are necessary to cause the magazine to rotate in the right direction, that is, so that its lower portion will move in synchronism with the conveyor and at a proper speed.

The movement of the magazine with the conveyor assures the accurate dropping of the confection into the moving sacks and permits a faster operation of the machine.

It will be noted that the upwardly extending frame member 331 (Fig. 3) is secured to the frame of the machine by slots 402 and bolts 403, so that the magazine may be adjusted vertically to adapt it for bags of different length.

When the bags have passed the magazine 330, they are filled with confection, having already been closed at the bottom, but the tops are opened, and they may now be additionally filled by hand, by a plurality of operators, and a sufficient number of operators may be employed to operate the machine at high speed. The bags are next carried to the upper sealing mechanism.

The upper sealing mechanism may be indicated in its entirety by the numeral 410, Fig. 4, and it is disposed at the right hand end of the frame work of Figure 4 so as to effect a sealing of the upper ends of the bags just before they are discharged from the conveyor. This sealing mechanism is in most respects similar in construction to the bottom sealing mechanism shown in Figure 26 and described in regard to Figure 8, except that the rotating elements are inverted and the heated sealing rolls are located at the top so as to engage, compress together, crimp, heat and seal the top edges of the bag as shown in Figures 14 and 15.

In order to drive this sealing mechanism, the conveyor shaft 116, Fig. 1B and Fig. 4, is provided with a sprocket 411 engaged by a chain 412 which engages a sprocket 413 carried by a shaft 414.

Referring now to Figure 15, the shaft 414 is rotatably mounted in suitable bearings carried by the longitudinal frame members 106, 107 and the shaft is provided with a pair of bevel gears 415, each engaging a bevel gear 416 carried by vertical shafts 417, 418. Members 419, 419 are insulating members carried by shafts 417, 418, and having slip rings and brushes to conduct electric current to the sealing roll heaters. The sealing rolls 422, 423 are carried by the shafts 417 and 418 and are similar in construction to those previously described except that the toothed edge is provided with a multiplicity of regularly spaced half cylindrical slots 426 for the purpose of receiving the sticks of all-day suckers when this form of confection is to be enclosed in a bag.

The two half cylindrical slots 424 on the adjacent sealing rolls 422, 423 register with each other and form a cylindrical bore at the juncture of these rolls and this bore is adapted to receive the stick of the all-day sucker. When confections are to be sealed which do not have projecting sticks, the adjustment of the sealing rolls 422, 423 with respect to the conveyor is changed so that the slots or grooves 424 engage each other at a time when there is no sealing to be done, that is, at the time when one bag is passed and the next bag has not yet arrived between the rolls.

The sealing rolls are like those previously described, heated electrically and the temperature is controlled by means of a thermostatic switch actuated by a suitable thermally responsive bulb, and the temperature may be maintained, for example, from 350° F. to 400° F. for one speed of the machine. If the machine is to be operated at a faster speed, then the temperature should be appropriately raised as more heat will be taken from the rolls in a certain amount of time, because more bags will be sealed per unit of time.

The sealing rolls 422, 423 are driven in opposite directions by the bevel gears 416 and the teeth on the rolls intermesh and produce a crimp and seal in the top of the bag, just as previously described with respect to the bottom of the bag.

When all-day suckers or other confections having projecting sticks, ropes or the like are to be sealed in bags, then the additional mechanism shown in Figures 14 and 15 must be used for the purpose of effecting a definite alignment of the sticks and assuring their entry into the grooves 424.

When the machine is used for packaging confectionery of a character not having the projecting sticks, then the gears driving the sealing rolls 422, 423 may be adjusted by rotating the plate 41a a one-twelfth of a revolution relative to plate 416 to bring the grooves 424 to a point which is located between the bags carried by the conveyor at the time of the sealing of the upper edge of the bag.

Then the grooves 424 will be ineffective, and the upper edge of the bag will be completely sealed because the sealing rolls 422, 423 have the ordinary toothed surface between the grooves 424, as previously described with respect to the other sealing rolls.

For the purpose of effecting a proper alignment of the wooden sticks when a confection having a wooden stick is to be packaged, the machine is preferably provided with suitable guides 430, 431, and the guides 430 and 431 comprise elongated metal bars provided with outwardly turned angular ends 432. These angular ends make a wider opening at the point where the sticks are received between the guides 430, 431.

The guides 430, 431 may be carried by the longitudinally extending frame members 108 and 109, and include the braces 433 and transverse bar 434. The guide members 430, 431 are preferably provided with one or more, preferably two, pairs of spring pressed plungers 435 (Fig. 41) and 436.

These spring pressed plungers comprise headed metal members provided with a cylindrical stem slidably mounted in a bore in each of the guide members 430, 431, and the spring is confined beneath the head in the counterbore 437. A cotterpin through the end of the stem holds the head against the spring under compression, and the head of the plunger is preferably partially spherical at its outer surface 438.

Thus the rounded camming surface 438 is adapted to engage any upwardly projecting stick and cause it to tilt backward, as the "all day suckers" progress along the machine on the conveyor, with the sticks between the guides 430, 431. For example, in Fig. 45 it will be seen that the sticks 439 may project upward at the left hand side of the figure at random in any of a multiplicity of different angular directions, just before they pass by the plungers 435.

The two plungers 435 have their cotterpins so located that the plungers are preferably out of contact, but close enough to engage the sticks 439 and permit the sticks to cam the plungers apart, as the sticks pass through; but the sticks are all tilted backward in the bag to the angular position shown at the stick 440 (Fig. 45). This places all of the sticks in a predetermined position so that they are sure to be engaged properly by a stick-handling mechanism.

The stick-handling mechanism is also carried by a framework which is supported on the side frame member 109, at the left of Fig. 14. This framework includes a pair of upwardly extending bars 441, 442, carried by the frame member 109, and joined at the top by a transverse frame member 443. The transverse frame member 443 (Fig. 45) carries a suitable socket member 444 for fixedly supporting the upper end of a shaft 445, the lower end of which is fixedly secured in the socket member 446.

The shaft 444 carries a camming arm 447 (Fig. 41), which is formed on the right hand of Fig. 41 with a hooked camming surface 448.

The shaft also carries a stick-engaging arm 449, which is of sufficient length to reach out and engage the sticks 439, 440 and carry them over into proper position to be engaged between the grooves 424.

The stick-engaging arm 449 preferably has its end provided with a pointed metal finger 450, which is resiliently supported on the arm by means of a closely coiled helical spring 451.

The finger 450 may be clamped to the arm by a suitable supporting rod 456, having adjustable nuts 457 so that the finger may be moved upward and downward on the arm 449 to adjust it to such a position that it will always clear the tops of the bags, but will engage the sticks.

At its lower end the rod 456 has a laterally projecting arm 458 and a downwardly projecting extension 459, which carries the finger 450.

The seat-engaging arm 449 is spring-urged in a clockwise direction (Fig. 14) by a coil spring 453. One end of the spring 453 is engaged in a collar 454 carried by the fixed shaft 445. The other end of the spring is engaged in the hub 455 of the stick-engaging arm 449. The hub 455 may also carry the cam member 447, both being rotatably supported at predetermined elevation by means of a collar 459a.

In order to insure the definite location of the stick-engaging arm 449 at the beginning of its movement, the frame, including the bar 441 preferably supports an inwardly projecting frame member 460, which is provided with a spring detent 461. The spring detent has one flange bolted to the bottom of 460, and the other flange extending diagonally toward the end of the stick-engaging arm 449, and outwardly turned at 462, so that the end of the stick-engaging arm may cam past it and be retained.

The strength of the biasing spring 453 (Fig. 47) is sufficient to cause the stick-engaging arm 449 to snap past the detent 461 (Fig. 14).

The shaft 418, which carries the sealing roll 423 (Fig. 15) is extended upward and also supports a cam disc 463 (Fig. 15, Fig. 47). The cam disc has a plurality of upwardly projecting studs 464, secured by nuts, and reduced threaded portions in apertures in the disc at regularly spaced points on a circle.

The studs 464 have one side cut away to provide a flat surface 465, and the flat surfaces are all disposed at a predetermined angularity with respect to the camming surface 448 (Fig. 41) so that the studs are adapted to engage and actuate the camming surface 448, but at a predetermined point they are adapted to pass the point 466 of the cam (Fig. 41).

Thus, as the sealing roll shaft 418 rotates at a regular rate of speed, the camming disc 463 rotates also in a counter-clockwise direction in Fig. 41, and the studs 464 are adapted to engage the cam 448, rotate it counterclockwise, and with it the stick-engaging arm 449.

The cam 448 rotates far enough for its tip 466 to pass the stud 464, which it is engaging, and thereafter the cam is released, and under the pressure of spring 453 the cam springs backward in a clockwise direction in Fig. 41. This movement of the cam 447 causes the stick-engaging arm 449 to swing back and forth from the full line position of Fig. 41 to the dotted line position.

In the dotted line position the stick-engaging arm 449 is engaged and detained by the spring detent 461 in such position that it does not project into the path of the sticks between the guides 430 and 431. As soon as a stick in the angular position 440 (Fig. 45) has passed the finger 450, the actuation of the cam 447 also moves the arm 449, and the finger 450 engages behind the stick and moves it from the angular position 440 (Fig. 45) to the erect position 467, shown in Fig. 45.

In order to provide the mechanism with a definite shoulder against which the finger 450 presses the stick 467, the sealing disc shaft 420 also supports a metal disc 468 (Fig. 15 and Fig. 47). This disc is seen in Fig. 41 above the sealing disc 422, and it is provided with a plurality of radial shoulders 469 with beveled surfaces 470 leading to the periphery 471.

The shoulders 469 correspond in number to the camming studs 464, six of which are employed in the embodiment illustrated, and stop disc 468 rotates at a regular speed with the sealing disc 422.

Stop disc 468 has its radial stop surfaces 469 in registry with the clockwise side (Fig. 41) of each groove 424. Thus the stop disc 468 has a stop surface 469 located slightly forwardly of the line of centers of the shafts 417 and 418. When a stick 467 is to be received between the grooves 424 of the sealing rolls 422 and 423, the trailing edges of the grooves 424 adjacent the line of centers between those shafts are still open sufficiently to receive the stick 467, when the stick-engaging arm 449 swings around and its finger 450 drives the stick against the shoulder 469.

The step-by-step motion of the stick or engaging shoulder 469 takes the sticks from the position of 440 to that of Fig. 7, where they are firmly held between the grooves 424 while the toothed surfaces of the sealing rolls 422 and 423 are heating, crimping, and sealing the end of the bag at both sides of the stick and around the stick.

The position of the stick-engaging arm 449 shown in Fig. 14 is the inoperative position, in which it is secured by a pin 472, when the confection does not have a stick and this part of the mechanism is not used. Then the cam 447 is drawn over out of engagement with the studs 464. After the bags of confection have passed the sealing rolls 422, 423, they are sealed and the conveyor continues to carry the packaged confection toward the right in Fig. 4 and in Fig. 1B, and as the conveyor inverts the buckets 125 (Fig. 1B), the packaged confection 150 falls out of the bucket on the belt conveyor 143.

The belt conveyor may carry the packaged confection 150 up and deposit it on a table, where it may be inspected and assembled with like confections for further packaging in lots suitable for sale.

The operation of my packaging machine has already been described in connection with the various parts of the machine. The present machine is adapted to operate at greater speed than any of the devices of the prior art of which I am aware for accomplishing the same purpose.

Due to the arrangement of the open packages in the buckets carried by the conveyor in horizontal position, the filling operation, which usually takes longer than the operation of making a sack, can be carried on at a plurality of points by a plurality of hoppers in such manner that the filling can be kept in step and at the same pace as the making of the empty containers.

The present device is adapted to be used for packaging all sorts of candy or other confections, and as described, it will handle confections of all shapes, including those having projecting sticks. The covering is sealed closely about both sides of the stick, and the stick is uniformly located in the middle of the sealed end of the package so as to present a symmetrical and attractive appearance.

The parts of the machine are adapted to be adjusted for handling various sizes of bags and various sizes of confection, and the packaging operation may be accomplished very economically on account of the high speed of the machine and the lack of necessity for manual labor.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a packaging machine for confections and the like, utilizing a flexible packaging material, the parts of which are adapted to be sealed together by heat and pressure, a sealing mechanism comprising a pair of rotatable sealing rolls having toothed peripheries, the teeth of which are adapted to interengage with each other, electrical means carried by each of said sealing rolls for heating the roll, and thermostatic means including a part slidably engaging said rolls for controlling the energization of said electric heating means, said sealing rolls being provided with registering grooves for receiving the sticks of confections which have a projecting stick, whereby the package may be crimped and sealed by pressure and heat about said sticks.

2. In a packaging machine for confections and the like, utilizing a flexible packaging material, the parts of which are adapted to be sealed together by heat and pressure, a sealing mechanism comprising a pair of rotatable sealing rolls having toothed peripheries, the teeth of which are adapted to interengage with each other, electrical means carried by each of said sealing rolls for heating the roll, and thermostatic means including a part slidably engaging said rolls for controlling the energization of said electric heating means, said sealing rolls being provided with registering grooves for receiving the sticks of confections which have a projecting stick, whereby the package may be crimped and sealed by pressure and heat about said sticks, and driving mechanism adapted to permit rotative adjustment of said sealing rolls with their grooves in position to avoid engagement with the packages when the confection is without projecting sticks.

3. In a packaging machine, the combination of a conveyor for conveying a plurality of open ended packages of flexible material with a pair of sealing rolls located to engage the open ends of said packages as they progress past said sealing rolls in said conveyor, said sealing rolls being formed with serrated inter-engaging edges, and said sealing rolls being heated, whereby the pressure and heat effects a sealing of the packages as they are conveyed through the sealing rolls, said sealing rolls being provided with a plurality of registering grooves for the reception of sticks carried by confections in said packages.

4. In a packaging machine, the combination of a conveyor for conveying a plurality of open ended packages of flexible material with a pair of sealing rolls located to engage the open ends of said packages as they progress past said sealing rolls in said conveyor, said sealing rolls being formed with serrated inter-engaging edges, and said sealing rolls being heated, whereby the pressure and heat effects a sealing of the packages as they are conveyed through the sealing rolls, said sealing rolls being provided with a plurality of registering grooves for the reception of sticks carried by confections in said packages, and means for effecting a predetermined alignment and location of said sticks in said grooves as the conveyor progresses and the sticks are being received in said grooves.

5. In a packaging machine, the combination of a conveyor for conveying a plurality of open ended packages of flexible material with a pair of sealing rolls located to engage the open ends of said packages as they progress past said sealing rolls in said conveyor, said sealing rolls being formed with serrated inter-engaging edges, and said sealing rolls being heated, whereby the pressure and heat effects a sealing of the packages as they are conveyed through the sealing rolls, said sealing rolls being provided with a plurality of registering grooves for the reception of sticks carried by confections in said packages, and means for effecting a predetermined alignment and location of said sticks in said grooves as the conveyor progresses and the sticks are being received in said grooves, said latter means including a pair of guides, and means for tilting said sticks to approximate the same angle.

6. In a packaging machine, the combination of a conveyor for conveying a plurality of open ended packages of flexible material with a pair of sealing rolls located to engage the open ends of said packages as they progress past said sealing rolls in said conveyor, said sealing rolls being formed with serrated inter-engaging edges, and said sealing rolls being heated, whereby the pressure and heat effects a sealing of the packages as they are conveyed through the sealing rolls, said sealing rolls being provided with a plurality of registering grooves for the reception of sticks carried by confections in said packages, and means for effecting a predetermined alignment and location of said sticks in said grooves as the conveyor progresses and the sticks are being received in said grooves, said latter means including a pair of guides, and means for tilting said sticks to approximate the same angle, and step-by-step means for engaging said sticks and driving the sticks into position in said grooves.

7. In a packaging machine, the combination of a conveyor for conveying a plurality of open ended packages of flexible material with a pair of sealing rolls located to engage the open ends of said packages as they progress past said sealing rolls in said conveyor, said sealing rolls being formed with serrated inter-engaging edges, and said sealing rolls being heated, whereby the pressure and heat effects a sealing of the packages as they are conveyed through the sealing rolls, said sealing rolls being provided with a plurality of registering grooves for the reception of sticks carried by confections in said packages, and means for effecting a predetermined alignment and location of said sticks in said grooves as the conveyor progresses and the sticks are being received in said grooves, said latter means including a pair of guides, and means for tilting said sticks to approximate the same angle, and step-by step means for engaging said sticks and driving the sticks into position in said grooves, one of said sealing rolls being provided with a member having a stop surface registering with one side of its grooves, against which the sticks may be located.

8. In a packaging machine, the combination of a conveyor for conveying a plurality of open ended packages of flexible material with a pair of sealing rolls located to engage the open ends of said packages as they progress past said sealing rolls in said conveyor, and said sealing rolls being heated, whereby the pressure and heat effects a sealing of the packages as they are conveyed through the sealing rolls, said sealing rolls being provided with a plurality of registering grooves for the reception of sticks carried by confections in said packages, and means for effecting a predetermined alignment and location of said sticks in said grooves as the conveyor progresses and the sticks are being received in said grooves, said latter means including a pair of guides, and means for tilting said sticks to approximate the same angle.

9. In a packaging machine, the combination of a conveyor for conveying a plurality of open ended packages of flexible material with a pair of sealing rolls located to engage the open ends of said packages as they progress past said sealing rolls in said conveyor, and said sealing rolls being heated, whereby the pressure and heat effects a sealing of the packages as they are conveyed through the sealing rolls, said sealing rolls being provided with a plurality of registering grooves for the reception of sticks carried by confections in said packages, and means for effecting a predetermined alignment and location of said sticks in said grooves as the conveyor progresses and the sticks are being received in said grooves, said latter means including a pair of guides, and means for tilting said sticks to approximate the same angle, and step-by-step means for engaging said sticks and driving the sticks into position in said grooves.

10. In a packaging machine, the combination of a conveyor for conveying a plurality of open ended packages of flexible material with a pair of sealing rolls located to engage the open ends of said packages as they progress past said sealing rolls in said conveyor, and said sealing rolls being heated, whereby the pressure and heat affects a sealing of the packages as they are conveyed through the sealing rolls, said sealing rolls being provided with a plurality of registering grooves for the reception of sticks carried by confections in said packages, and means for effecting a predetermined alignment and location of said sticks in said grooves as the conveyor progresses and the sticks are being received in said grooves, said latter means including a pair of guides, and means for tilting said sticks to approximate the same angle, and step-by-step means for engaging said sticks and driving the sticks into position in said grooves, one of said sealing rolls being provided with a member having a stop surface registering with one side of its grooves, against which the sticks may be located.

JOSEPH WILLIAM FAY.